United States Patent [19]
Ohno et al.

[11] Patent Number: 6,061,616
[45] Date of Patent: May 9, 2000

[54] ACTIVATION DECISION APPARATUS FOR PASSIVE RESTRAINTS

[75] Inventors: Yoshikazu Ohno, Okazaki; Tatsuhiro Inayoshi, Toyota, both of Japan

[73] Assignee: Toyota Jidosha Kabushiki Kaisha, Aichi-ken, Japan

[21] Appl. No.: 08/810,588

[22] Filed: Mar. 4, 1997

[30] Foreign Application Priority Data

Mar. 15, 1996 [JP] Japan ................... 8-087702

[51] Int. Cl.⁷ .................................................. B60R 21/32
[52] U.S. Cl. .......................... 701/45; 180/282; 180/268; 280/735
[58] Field of Search ................ 701/45; 280/735; 180/282, 268

[56] References Cited

U.S. PATENT DOCUMENTS

| | | | |
|---|---|---|---|
| 5,515,276 | 5/1996 | Kura et al. | 180/282 |
| 5,594,647 | 1/1997 | Yasuda et al. | 701/45 |
| 5,609,358 | 3/1997 | Iyoda et al. | 701/45 |
| 5,712,784 | 1/1998 | Fendt et al. | 280/735 |
| 5,787,377 | 7/1998 | Watanabe et al. | 701/45 |

FOREIGN PATENT DOCUMENTS 4325348A  11/1992  Japan .

*Primary Examiner*—Tan Nguyen
*Assistant Examiner*—Olga Hernandez
*Attorney, Agent, or Firm*—Kenyon & Kenyon

[57] ABSTRACT

A waveform deforming element (315) of an arithmetic operations unit (314) divides the waveform of an input acceleration signal by a first level R1 higher than the level '0' and a second level R2 lower than the level '0'. A first coefficient multiplier element (316) in the waveform deforming element (315) multiplies the waveform segments of not lower than the first level R1 by a predetermined coefficient 'm' of not less than 0 and not greater than 1 ($0 \leq m \leq 1$), whereas a second coefficient multiplier element (317) in the waveform deforming element (315) multiplies the waveform segments of not higher than the second level R2 by a predetermined coefficient 'n' of not less than 1 ($1 \leq n$). This procedure deforms the waveform of the observed acceleration signal. An integration element (318) of the arithmetic operations unit (314) then integrates the acceleration signal having the deformed waveform with respect to time, so as to obtain an integral value of the acceleration signal. This structure ensures an appropriate determination of activation or inactivation of passive restraints even in case of an underside hit.

16 Claims, 15 Drawing Sheets

Fig. 4
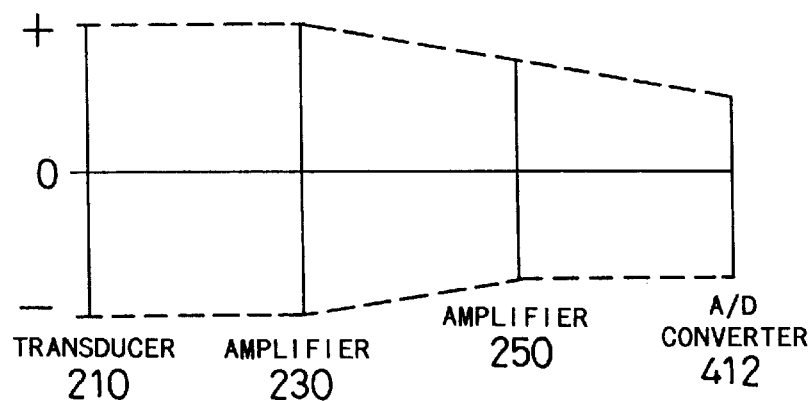
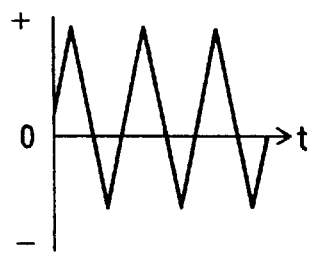
Fig. 5(a)
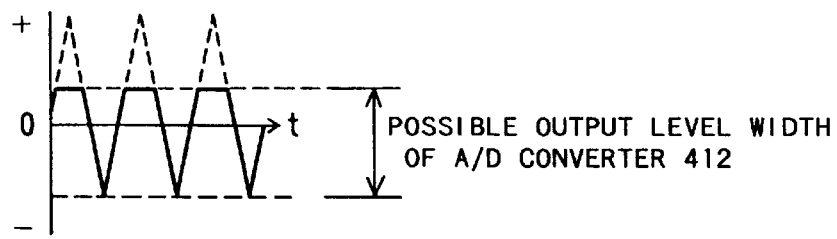
Fig. 5(b)

Fig. 6
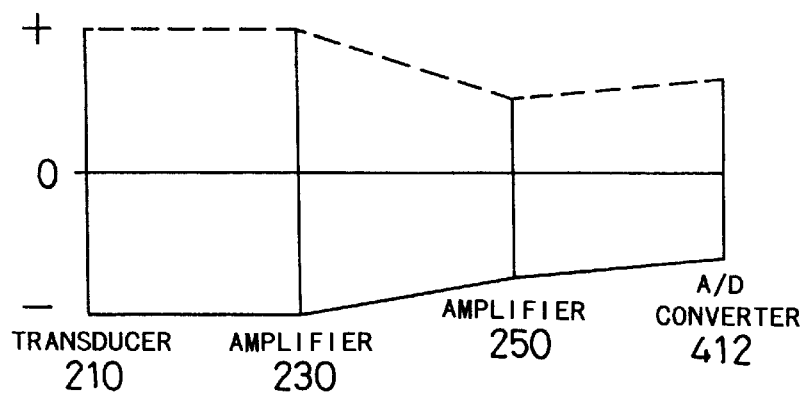
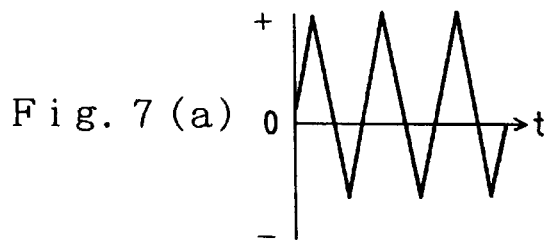
Fig. 7(a)
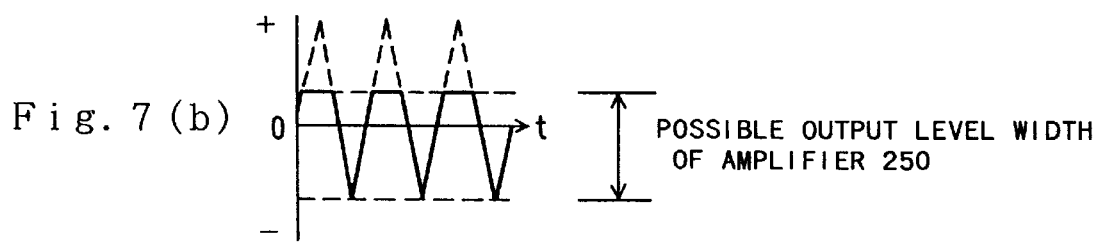
Fig. 7(b)
POSSIBLE OUTPUT LEVEL WIDTH OF AMPLIFIER 250
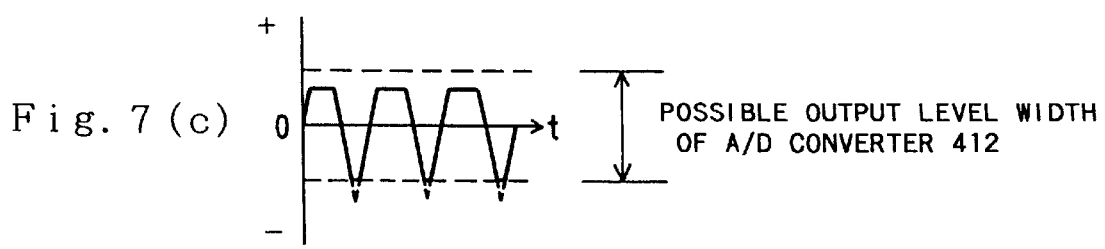
Fig. 7(c)
POSSIBLE OUTPUT LEVEL WIDTH OF A/D CONVERTER 412

POSSIBLE OUTPUT LEVEL WIDTH OF AMPLIFIER 230

≒

≒

ACTIVATION DECISION APPARATUS FOR PASSIVE RESTRAINTS

BACKGROUND OF THE INVENTION

1. Field of the Invention

The present invention relates to an activation decision apparatus for measuring an impact force or an acceleration applied to a vehicle and determining whether or not passive restraints, such as air bag units, mounted on the vehicle are to be activated, based on the results of measurement.

2. Description of the Prior Art

As a recent trend, passive restraints, such as air bag units and seat belts with pre-loaders, are generally mounted on a vehicle for the purpose of protecting a driver and passengers from damages in a crash. When a large impact is applied to the vehicle in a collision and an activation decision apparatus mounted on the vehicle determines that passive restraints are to be activated, an ignition device, such as a squib, ignites a gas-generating agent and thereby activates the passive restraints. The ignited gas-generating agent evolves a gas, and the pressure of the gas drives the passive restraints.

A conventional activation decision apparatus measures an impact applied to the vehicle, for example, with an acceleration sensor as an acceleration, compares the observed acceleration with a predetermined threshold value, and determines whether or not the passive restraints are to be activated, based on the results of comparison. For example, when a large impact is applied to the vehicle in a crash, the observed acceleration exceeds the predetermined threshold value, so that the passive restraints are activated. When a small impact is applied, on the other hand, the observed acceleration does not exceed the predetermined threshold value, so that the passive restraints are not activated. In the structure of determining activation or inactivation of passive restraints based on the magnitude of the observed acceleration, however, even in case of an underside hit when a greater impact is applied to the vehicle than in case of a collision of the vehicle, the observed acceleration exceeds the predetermined threshold value and the apparatus thereby determines that the passive restraints are to be activated. The proposed techniques accordingly do not use the observed acceleration itself for the decision, but integrate the acceleration and determine activation or inactivation of passive restraints based on the magnitude of the integral value (for example, 'Activation Apparatus for Passive Restraints on Vehicle' disclosed in JAPANESE PATENT LAID-OPEN GAZETTE No. 4-325348).

The term 'underside hit' in the description hereof implies that the vehicle runs on to a curb or an obstacle such as stone on the road or is caught in a depression or a hole in the road and a lower portion of the vehicle (including the lower face of the engine, the suspension, the lower face of the oil pan, and the wheels) thereby comes into contact with the obstacle.

FIGS. 11(a) through 11(d) show the process of determining activation or inactivation of passive restraints by the conventional activation decision apparatus in case of an underside hit and in case of a collision of the vehicle. FIG. 11(a) shows the waveform of the observed acceleration signal in case of an underside hit; FIG. 11(b) the integral waveform of FIG. 11(a); FIG. 11(c) the waveform of the observed acceleration signal in case of a collision of the vehicle; and FIG. 11 (d) the integral waveform of FIG. 11(c). The data of FIGS. 11(a) and 11(c) are plotted, with acceleration as ordinate and time 't' as abscissa, wherein the accelerations applied backward with respect to the vehicle are defined as the positive side and those applied forward are defined as the negative side. The data of FIGS. 11(b) and 11(d) are plotted, with integral value as ordinate and time 't' as abscissa, wherein Th on the ordinate represents a threshold value that is used as a criterion for determining activation or inactivation of passive restraints.

A collision of the vehicle is generally a non-elastic collision that accompanies deformation of the body. When the vehicle collides in a frontal crash, the accelerations applied to the vehicle occur only on the positive side (that is, backward with respect to the vehicle) as shown in FIG. 11(c). The accelerations generated before final determination of activation or inactivation of passive restraints are due to a deformation of the body on the frontal side of the vehicle and are accordingly not significantly large.

Integration of the acceleration gives a curve of the integral value as shown in FIG. 11(d) and activates the passive restraints at a time point t11, when the integral value exceeds the threshold value Th.

In case of an underside hit, on the other hand, although the energy of impact is relatively small, since the impact continues for a very short time period, accelerations applied to the vehicle are significantly large. Such an underside hit is an elastic collision, and the observed accelerations remarkably fluctuate both on the positive side (that is, backward with respect to the vehicle) and on the negative side (that is, forward with respect to the vehicle) as shown in FIG. 11(a). Since a greater impact is applied backward with respect to the vehicle than forward when the vehicle runs forward, the amplitude on the positive side becomes larger than the amplitude on the negative side (that is, the acceleration includes a positive DC component).

An absolute value of the integral of the acceleration on the positive side is accordingly larger than that on the negative side. The overall integral value (that is, the sum of the integral value on the positive side and the integral value on the negative side) thus gradually increases and eventually exceeds the threshold value Th at a time point t10 as shown in FIG. 11(b).

The known structure that integrates the observed acceleration and determines activation or inactivation of passive restraints based on the magnitude of the integral value can not appropriately discriminate the case of activation as shown in FIG. 11(d) from the case of inactivation as shown in FIG. 11(b).

SUMMARY OF THE INVENTION

The object of the present invention is to provide an activation decision apparatus that ensures an appropriate determination of activation or inactivation of passive restraints even in case of an underside hit.

At least part of the above and the other related objects are realized by a first activation decision apparatus for determining whether passive restraints mounted on a vehicle are to be activated. The first activation decision apparatus comprises: measurement means for measuring an impact applied in a specified direction of the vehicle and outputting a detection signal, which has a reference level set at an observed level when no impact is applied to the vehicle; waveform deforming means for deforming a waveform of the detection signal and generating waveform-deformed signals; integration means for integrating the waveform-deformed signals to obtain an integral value; and activation determination means for comparing the integral value obtained by the integration means with a preset threshold value and determining whether the passive restraints are to be activated, based on a result of the comparison. The waveform deforming means deforms the waveform of the detection signal, at least such that an absolute value of an integral obtained by integrating waveform segments of the waveform-deformed signal that are not lower than the reference level becomes smaller than an absolute value of an integral obtained by integrating waveform segments of the detection signal that are not lower than the reference level.

In case of an underside hit, when the observed detection signal has the larger amplitude of not lower than the reference level than the amplitude of not higher than the reference level, the structure of the first activation decision apparatus deforms the waveform of the detection signal such that the absolute value of an integral of the waveform segments of the waveform-deformed signal that are not lower than the reference level becomes smaller than the absolute value of an integral of the waveform segments of the detection signal that are not lower than the reference level. This structure effectively prevents the overall integral value (that is, the sum of the integral value of the waveform segments of not lower than the reference level and the integral value of the waveform segments of not higher than the reference level) obtained by the integration means from increasing and exceeding the preset threshold value. The first activation decision apparatus of the present invention accordingly ensures an appropriate determination of activation or inactivation of passive restraints even in case of an underside hit.

In accordance with one preferable application of the first activation decision apparatus, the waveform deforming means comprises means for setting a specific level that is higher than the reference level of the detection signal but lower than a maximum level of the detection signal and multiplying waveform segments of the detection signal that are not lower than the specific level by a coefficient 'm', where 0<m<1, thereby deforming the waveform of the detection signal.

In this preferable structure, the waveform segments of not lower than the specific level are multiplied by the coefficient 'm' that is less than 1, so that integration of the waveform-deformed signal by the integration means gives a smaller absolute value of the integral of the waveform segments that are not lower than the reference level.

The present invention is also directed to a second activation decision apparatus for determining whether passive restraints mounted on a vehicle are to be activated. The second activation decision apparatus comprises: measurement means for measuring an impact applied in a specified direction of the vehicle and outputting a detection signal, which has a reference level set at an observed level when no impact is applied to the vehicle; waveform deforming means for deforming a waveform of the detection signal and generating waveform-deformed signals; integration means for integrating the waveform-deformed signals to obtain an integral value; and activation determination means for comparing the integral value obtained by the integration means with a preset threshold value and determining whether the passive restraints are to be activated, based on a result of the comparison. The waveform deforming means deforms the waveform of the detection signal, at least such that an absolute value of an integral obtained by integrating waveform segments of the waveform-deformed signal that are not higher than the reference level becomes larger than an absolute value of an integral obtained by integrating waveform segments of the detection signal that are not higher than the reference level.

In case of an underside hit, when the observed detection signal has the larger amplitude of not lower than the reference level than the amplitude of not higher than the reference level, the structure of the second activation decision apparatus deforms the waveform of the detection signal such that the absolute value of an integral of the waveform segments of the waveform-deformed signal that are not higher than the reference level becomes larger than the absolute value of an integral of the waveform segments of the detection signal that are not higher than the reference level. This structure effectively prevents the overall integral value (that is, the sum of the integral value of the waveform segments of not lower than the reference level and the integral value of the waveform segments of not higher than the reference level) obtained by the integration means from increasing and exceeding the preset threshold value. The second activation decision apparatus of the present invention accordingly ensures an appropriate determination of activation or inactivation of passive restraints even in case of an underside hit.

In accordance with one preferable application of the second activation decision apparatus, the waveform deforming means comprises means for setting a specific level that is lower than the reference level of the detection signal but higher than a minimum level of the detection signal and multiplying waveform segments of the detection signal that are not higher than the specific level by a coefficient 'n' where 1<n, thereby deforming the waveform of the detection signal.

In this preferable structure, the waveform segments of not higher than the specific level are multiplied by the coefficient 'n' that is greater than 1, so that integration of the waveform-deformed signal by the integration means gives a larger absolute value of the integral of the waveform segments that are not higher than the reference level.

The present invention is further directed to a third activation decision apparatus for determining whether passive restraints mounted on a vehicle are to be activated. The third activation decision apparatus comprises: measurement means for measuring an impact applied in a specified direction of the vehicle and outputting a detection signal, which has a reference level set at an observed level when no impact is applied to the vehicle; waveform extracting means for setting a first level that is higher than the reference level of the detection signal but lower than a maximum level of the detection signal and a second level that is lower than the reference level of the detection signal but higher than a minimum level of the detection signal and extracting waveform segments of the detection signal between the first level and the second level, thereby generating waveform-extracted signals; integration means for integrating the waveform-extracted signals to obtain an integral value; and activation determination means for comparing the integral value obtained by the integration means with a preset threshold value and determining whether the passive restraints are to be activated, based on a result of the comparison, wherein a level width between the reference level and the first level is narrower than a level width between the reference level and the second level.

In case of an underside hit, when the observed detection signal has the larger amplitude of not lower than the reference level than the amplitude of not higher than the reference level, the waveform extracting means of the third activation decision apparatus of the present invention carries out the waveform extraction process discussed above and generates a waveform-extracted signal which has the smaller amplitude of not lower than the reference level than the amplitude of not higher than the reference level. Integration of the waveform-extracted signal by the integration means makes the absolute value of the integral of the waveform segments of not lower than the reference level substantially identical with the absolute value of the integral of the waveform segments of not higher than the reference level. This structure effectively prevents the overall integral value (that is, the sum of the integral value of the waveform segments of not lower than the reference level and the integral value of the waveform segments of not higher than the reference level) from increasing and exceeding the preset threshold value. The third activation decision apparatus of the present invention accordingly ensures an appropriate determination of activation or inactivation of passive restraints even in case of an underside hit.

The present invention is also directed to a fourth activation decision apparatus for determining whether passive restraints mounted on a vehicle are to be activated. The fourth activation decision apparatus comprises: measurement means for measuring an impact applied in a specified direction of the vehicle and outputting a detection signal, which has a reference level set at an observed level when no impact is applied to the vehicle; sampling means for sampling the detection signal in time series; addition means for adding levels of the sampled detection signal to make a total; and activation determination means for comparing the total obtained by the addition means with a preset threshold value and determining whether the passive restraints are to be activated, based on a result of the comparison. The addition means comprises at least means for setting a specific level that is higher than the reference level of the detection signal but lower than a maximum level of the detection signal, and skipping some data of the sampled detection signal in the process of adding the levels of the sampled detection signal that are not lower than the specific level.

In the fourth activation decision apparatus of the present invention, the addition means adds the levels of the sampled detection signal in the manner discussed above. The procedure of skipping some data of the sampled detection signal among the waveform segments that are not lower than the specific level gives a smaller absolute value of the total of the waveform segments that are not lower than the reference level. Even in case of an underside hit, when the observed detection signal has the larger amplitude of not lower than the reference level than the amplitude of not higher than the reference level, this structure effectively prevents the total (that is, the total of the sum of the waveform segments of not lower than the reference level and the sum of the waveform segments of not higher than the reference level) from increasing and exceeding the preset threshold value.

The present invention is further directed to a fifth activation decision apparatus for determining whether passive restraints mounted on a vehicle are to be activated. The fifth activation decision apparatus comprises: measurement means for measuring an impact applied in a specified direction of the vehicle and outputting a detection signal, which has a reference level set at an observed level when no impact is applied to the vehicle; sampling means for sampling the detection signal in time series; addition means for adding levels of the sampled detection signal to make a total; and activation determination means for comparing the total obtained by the addition means with a preset threshold value and determining whether the passive restraints are to be activated, based on a result of the comparison. The addition means comprises at least means for setting a specific level that is lower than the reference level of the detection signal but higher than a minimum level of the detection signal, and interpolating signal levels lower than the reference level into the sampled detection signal in the process of adding the levels of the sampled detection signal that are not higher than the specific level.

In the fifth activation decision apparatus of the present invention, the addition means adds the levels of the sampled detection signal in the manner discussed above. The procedure of interpolating some data into the waveform segments of the sampled detection signal that are not higher than the specific level gives a larger absolute value of the total of the waveform segments that are not higher than the reference level. Even in case of an underside hit, when the observed detection signal has the larger amplitude of not lower than the reference level than the amplitude of not higher than the reference level, this structure effectively prevents the total (that is, the total of the sum of the waveform segments of not lower than the reference level and the sum of the waveform segments of not higher than the reference level) from increasing and exceeding the preset threshold value.

The present invention is also directed to a first activation decision method for determining whether passive restraints mounted on a vehicle are to be activated. The first method comprises the steps of: (a) measuring an impact applied in a specified direction of the vehicle and obtaining a detection signal, which has a reference level set at an observed level when no impact is applied to the vehicle; (b) setting a first level that is higher than the reference level of the detection signal but lower than a maximum level of the detection signal and a second level that is lower than the reference level of the detection signal but higher than a minimum level of the detection signal and extracting waveform segments of the detection signal between the first level and the second level, thereby generating waveform-extracted signals; (c) integrating the waveform-extracted signals to obtain an integral value; and (d) comparing the integral value obtained by the step (c) with a preset threshold value and determining whether the passive restraints are to be activated, based on a result of the comparison, wherein a level width between the reference level and the first level is narrower than a level width between the reference level and the second level.

In accordance with another aspect, the present invention provides a second activation decision method for determining whether passive restraints mounted on a vehicle are to be activated. The second method comprises the steps of: (a) measuring an impact applied in a specified direction of the vehicle and obtaining a detection signal, which has a reference level set at an observed level when no impact is applied to the vehicle; (b) sampling the detection signal in time series; (c) adding levels of the sampled detection signal to make a total; and (d) comparing the total obtained by the step (c) with a preset threshold value and determining whether the passive restraints are to be activated, based on a result of the comparison, wherein the step (c) comprises at least the step of: (e) setting a specific level that is higher than the reference level of the detection signal but lower than a maximum level of the detection signal, and skipping some data of the sampled detection signal in the process of adding the levels of the sampled detection signal that are not lower than the specific level.

In accordance with still another aspect, the present invention provides a third activation decision method for determining whether passive restraints mounted on a vehicle are to be activated. The third method comprises the steps of: (a) measuring an impact applied in a specified direction of the vehicle and obtaining a detection signal, which has a reference level set at an observed level when no impact is applied to the vehicle; (b) sampling the detection signal in time series; (c) adding levels of the sampled detection signal to make a total; and (d) comparing the total obtained by the step (c) with a preset threshold value and determining whether the passive restraints are to be activated, based on a result of the comparison, wherein the step (c) comprises at least the step of: (e) setting a specific level that is lower than the reference level of the detection signal but higher than a minimum level of the detection signal, and interpolating signal levels lower than the reference level into the sampled detection signal in the process of adding the levels of the sampled detection signal that are not higher than the specific level.

These and other objects, features, aspects, and advantages of the present invention will become more apparent from the following detailed description of the preferred embodiments with the accompanying drawings.

BRIEF DESCRIPTION OF THE DRAWINGS

FIG. 4 shows possible output level widths of the primary circuits in case of (1) when the waveform extraction process is carried out in the A/D converter 412 in the second embodiment;

FIGS. 5(a) and 5(b) show the waveforms of the acceleration signals in the primary circuits when the waveform extraction process is carried out in the A/D converter 412 in the second embodiment;

FIG. 6 shows possible output level widths of the primary circuits in case of (2) when the waveform extraction process is carried out in the amplifier 250 in the second embodiment;

FIGS. 7(a) through 7(c) show the waveforms of the acceleration signals in the primary circuits when the waveform extraction process is carried out in the amplifier 250 in the second embodiment;

DESCRIPTION OF THE PREFERRED EMBODIMENTS

Figure 1:
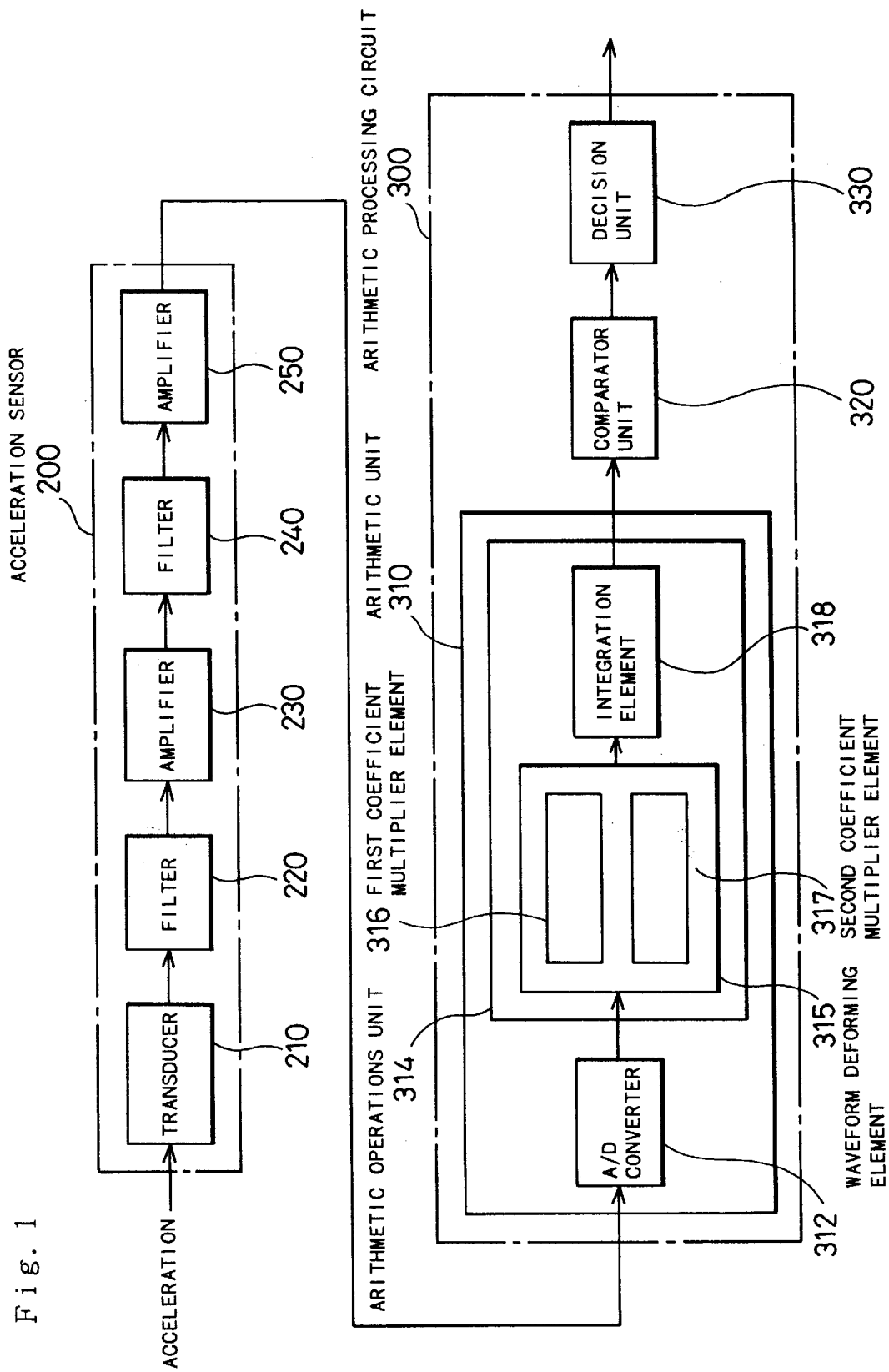
FIG. 1 is a block diagram illustrating structure of an activation decision apparatus as a first embodiment according to the present invention.

Some modes of carrying out the present invention are described as preferred embodiments. FIG. 1 is a block diagram illustrating structure of an activation decision apparatus as a first embodiment according to the present invention. The activation decision apparatus includes an acceleration sensor 200 and an arithmetic processing circuit 300 as shown in FIG. 1. The acceleration sensor 200 has a transducer 210, two filters 220 and 240, and two amplifiers 230 and 250, whereas the arithmetic processing circuit 300 has an arithmetic unit 310, a comparator unit 320, and a decision unit 330. The arithmetic unit 310 includes an analog/digital (A/D) converter 312 and an arithmetic operations unit 314, which is provided with a waveform deforming element 315 and an integration element 318. The waveform deforming element 315 has a first coefficient multiplier element 316 and a second coefficient multiplier element 317.

The arithmetic processing circuit 300 may be composed of, for example, a CPU, a ROM, a RAM, an I/O circuit, and so on. In that case, the arithmetic processing circuit 300 may be structured in such a way that each of the above-mentioned processing units works when the CPU executes a program stored in the ROM or RAM.

Such an activation decision apparatus is mounted on a predetermined portion of a vehicle (not shown), for example, on a center portion the vehicle. Passive restraints (not shown), such as air bag units and seat belts with pre-loaders, which are the objects to be activated, are arranged in the vicinity of a driver's seat and a passenger's seat in the vehicle. In this embodiment, these passive restraints are those for frontal crash that are activated when the vehicle collides in a frontal crash.

When the vehicle collides, for example, in a frontal crash or has an underside hit to receive an impact applied in a longitudinal direction thereof, the impact is detected as an acceleration in the longitudinal direction and converted to an electric signal by the transducer 210. The acceleration signal thus obtained passes through the filter 220, which filters out unrequired components of the acceleration signal (for example, a component due to the resonance characteristics of the transducer 210). The acceleration signal output from the filter 220 is then amplified by the amplifier 230 to a specific level that is substantially free from the noise effects, and again passes through the filter 240, which extracts only a signal component required for determining activation or inactivation of passive restraints from the filtered signal. The acceleration signal output from the filter 240 is regulated by the amplifier 250 to have a predefined sensitivity level as the output of the acceleration sensor 200 (for example, regulated to x mv per 1G of the acceleration) and eventually generated as an output signal of the acceleration sensor 200.

The resulting acceleration signal output from the acceleration sensor 200 is subsequently given to the arithmetic processing circuit 300. In the arithmetic unit 310 of the arithmetic processing circuit 300, the analog acceleration signal is first converted to a digital signal by the A/D converter 312, deformed in waveform as discussed later by the waveform deforming element 315 of the arithmetic operations unit 314, and integrated with respect to time by the integration element 318. The integral value output from the arithmetic unit 310 is compared with a preset threshold value Th in the comparator unit 320, and the result of comparison is input into the decision unit 330. The decision unit 330 determines whether or not the passive restraints are to be activated, based on the result of comparison, and outputs an activation signal to ignition devices (not shown), such as squibs, with the decision of activation. In accordance with a concrete procedure, for example, when the integral value gradually increases to exceed the preset threshold value Th, the decision unit 330 determines that the passive restraints are to be activated and outputs an activation signal to the squibs. Each squib that receives the activation signal ignites a gas-generating agent to evolve a gas and thereby drives the air bag unit or the seat belt with pre-loader.

Figure 2:
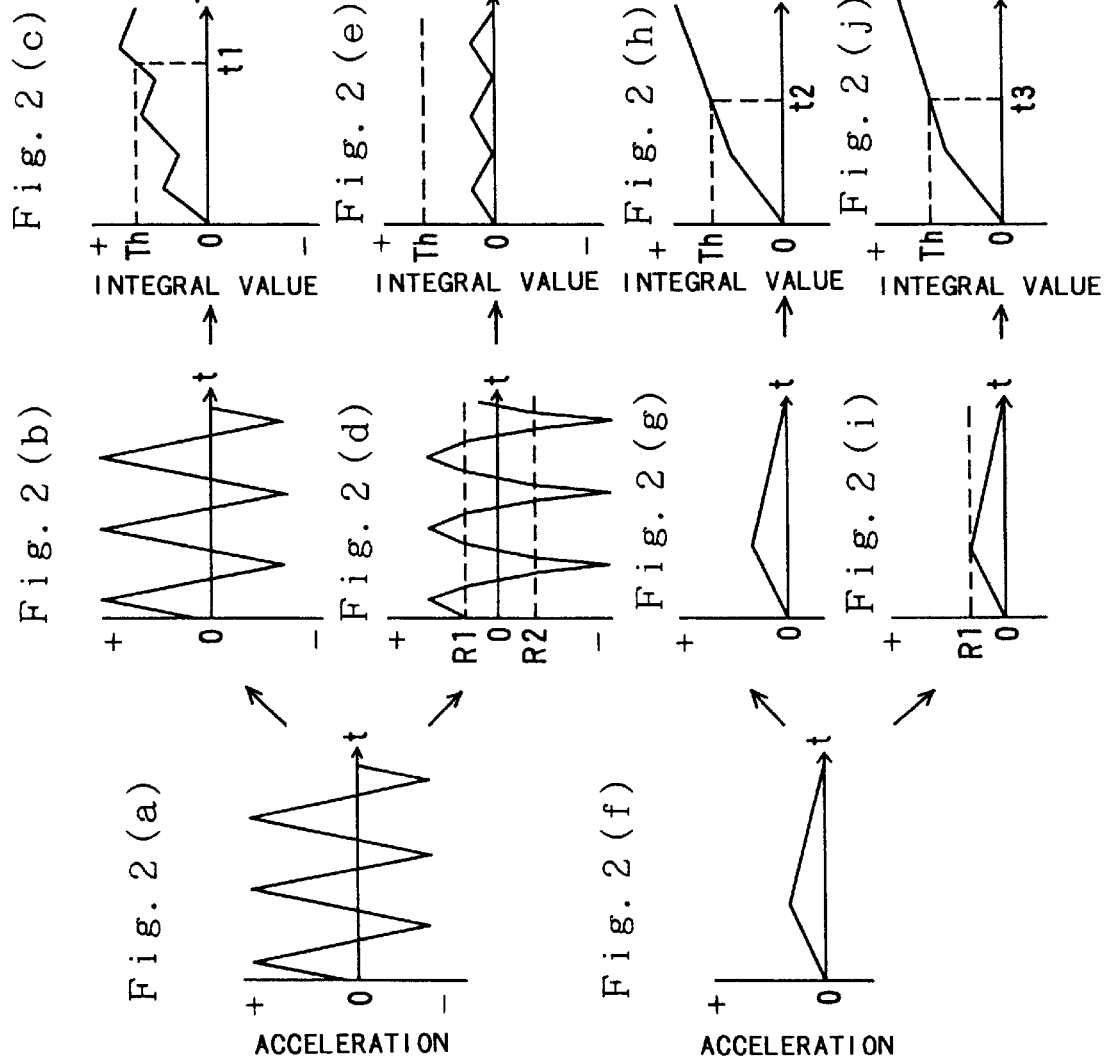
FIGS. 2(a) through 2(j) show the comparison in determination of activation or inactivation of passive restraints between the structure of the first embodiment and the conventional structure in case of an underside hit and in case of a collision of the vehicle.

The following describes the primary characteristics of this embodiment in case of an underside hit and in case of a collision of the vehicle. FIGS. 2(a) through 2(j) show the comparison in determination of activation or inactivation of passive restraints between the structure of the first embodiment and the conventional structure in case of an underside hit and in case of a collision of the vehicle. FIG. 2(a) shows the waveform of an acceleration signal detected in case of an underside hit; FIG. 2(b) the waveform of the acceleration signal immediately before integration in the conventional structure; and FIG. 2(c) the integral waveform of FIG. 2(b). FIG. 2(d) shows the waveform of the acceleration signal immediately before integration in the structure of this embodiment; and FIG. 2(e) the integral waveform of FIG. 2(d). FIG. 2(f) shows the waveform of an acceleration signal detected in case of a collision of the vehicle; FIG. 2(g) the waveform of the acceleration signal immediately before integration in the conventional structure; and FIG. 2(h) the integral waveform of FIG. 2(g). FIG. 2(i) shows the waveform of the acceleration signal immediately before integration in the structure of the embodiment; and FIG. 2(j) the integral waveform of FIG. 2(i). The data of FIGS. 2(a), 2(b), 2(d), 2(f), 2(g), and 2(i) are plotted, with acceleration as ordinate and time 't' as abscissa, wherein the accelerations applied backward with respect to the vehicle are defined as the positive side and those applied forward are defined as the negative side. The data of FIGS. 2(c), 2(e), 2(h), and 2(j) are plotted, with integral value as ordinate and time 't' as abscissa, wherein Th on the ordinate represents a threshold value that is used as a criterion for determining activation or inactivation of passive restraints.

In case of a collision of the vehicle (for example, in a frontal crash), the acceleration has substantially positive values as shown in FIG. 2(f); that is, the acceleration is generated only in the backward direction with respect to the vehicle. In case of an underside hit, on the other hand, the acceleration drastically varies to have both the positive and negative values as shown in FIG. 2(a); that is, the acceleration is generated in a significantly large level in both the forward direction and the backward direction with respect to the vehicle. In case of an underside hit, however, the greater impact is applied backward, and the larger acceleration is generated on the positive side (in the backward direction) rather than on the negative side (in the forward direction).

As discussed previously, the conventional structure directly integrates the observed acceleration signal. In case of an underside hit, the absolute value of the integral on the positive side becomes larger than the absolute value of the integral on the negative side, and the overall integral value gradually increases and eventually exceeds the threshold value Th as shown in FIG. 2(c). This causes an inappropriate determination that the passive restraints are to be activated even in case of an underside hit.

In the structure of the first embodiment, on the other hand, the waveform deforming element 315 of the arithmetic operations unit 314 first divides the waveform of the input acceleration signal by a first level R1 higher than the level '0' and a second level R2 lower than the level '0' as shown in FIG. 2(d). The first coefficient multiplier element 316 in the waveform deforming element 315 multiplies the waveform segments of not lower than the first level R1 by a predetermined coefficient 'm' of not less than 0 and not greater than 1 ($0 \leq m \leq 1$), whereas the second coefficient multiplier element 317 in the waveform deforming element 315 multiplies the waveform segments of not higher than the second level R2 by a predetermined coefficient 'n' of not less than 1 ($1 \leq n$). This procedure deforms the waveform of the observed acceleration signal. The acceleration signal having the deformed waveform is then integrated with respect to time in the integration element 318 of the arithmetic operations unit 314.

The first coefficient multiplier element 316 multiplies the waveform segments of the input acceleration signal that are not lower than the first level R1 by the predetermined coefficient 'm' of not less than 0 and not greater than 1, so as to decrease the absolute value of the integral of the acceleration signal on the positive side. The second coefficient multiplier element 317, on the other hand, multiplies the waveform segments of the input acceleration signal that are not higher than the second level R2 by the predetermined coefficient 'n' of not less than 1, so as to increase the absolute value of the integral of the acceleration signal on the negative side. This prevents the overall integral value from significantly increasing in case of an underside hit as shown in FIG. 2(e). Since the overall integral value does not exceed the threshold value Th, the decision unit 330 does not inappropriately determine that the passive restraints are to be activated in case of an underside hit.

In case of a collision of the vehicle, on the other hand, the waveform deforming process discussed above is not carried out unless the waveform of the acceleration signal on the positive side exceeds the first level R1 as shown in FIG. 2(i). Subsequent integration of the resulting acceleration signal accordingly gives an integral value similar to that obtained in the conventional structure as shown in FIG. 2(j). This ensures an appropriate determination of activation or inactivation of passive restraints, in case of a collision of the vehicle.

When the coefficient 'm' is equal to one, the waveform segments are multiplied by 1, so that the waveform segments of the acceleration signal that are not lower than the first level R1 are kept unchanged. When the coefficient 'm' is equal to zero, the waveform segments are multiplied by 0, so that the waveform segments of the acceleration signal that are not lower than the first level R1 are cut off. When the coefficient 'n' is equal to one, the waveform segments are multiplied by 1, so that the waveform segments of the acceleration signal that are not higher than the second level R2 are kept unchanged. In order to deform the waveform of the acceleration signal, it is accordingly required to set at least either one of the coefficients 'm' and 'n' equal to a value other than 1.

Figure 12:
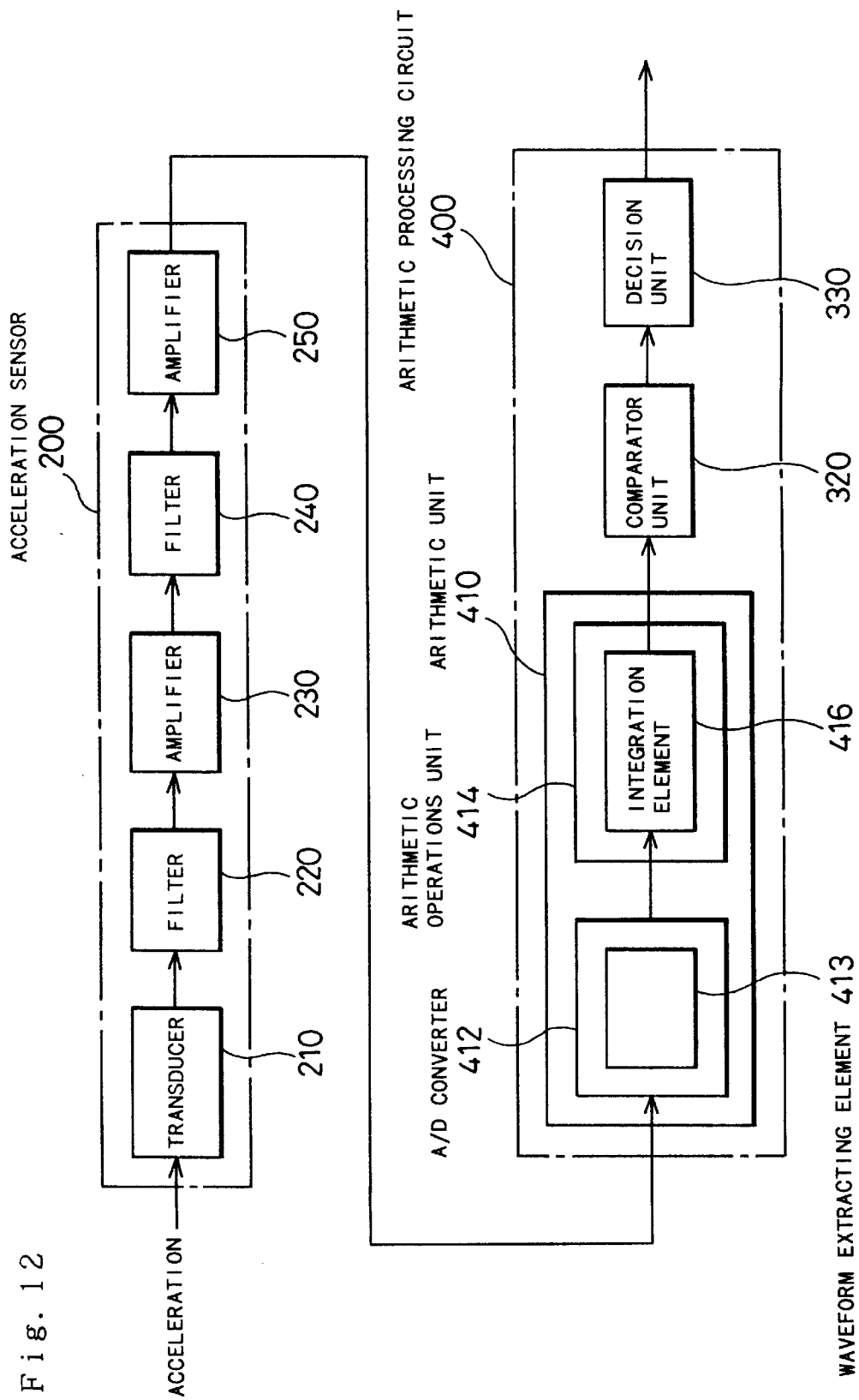
FIG. 12 is a block diagram illustrating structure of an activation decision apparatus as the second embodiment of the present invention.

The following describes a second embodiment according to the present invention. FIG. 12 is a block diagram illustrating structure of an activation decision apparatus as the second embodiment of the present invention. The activation decision apparatus includes an acceleration sensor 200 and an arithmetic processing circuit 400 as shown in FIG. 12. The acceleration sensor 200 of the second embodiment shown in FIG. 12 has the same structure as that of the first embodiment shown in FIG. 1. The arithmetic processing circuit 400 includes an arithmetic unit 410, a comparator unit 320, and a decision unit 330. The arithmetic unit 410 has an A/D converter 412 and an arithmetic operations unit 414. The arithmetic operations unit 414 is provided with an integration element 416, whereas the A/D converter 412 is provided with a waveform extracting element 413. The waveform extracting element 413 may be arranged inside the amplifier 250 or the amplifier 230 as discussed later.

The arithmetic processing circuit 400 may be composed of, for example, a CPU, a ROM, a RAM, an I/O circuit, and so on. In that case, the arithmetic processing circuit 400 may be structured in such a way that each of the above-mentioned processing units works when the CPU executes a program stored in the ROM or RAM.

Figure 3:
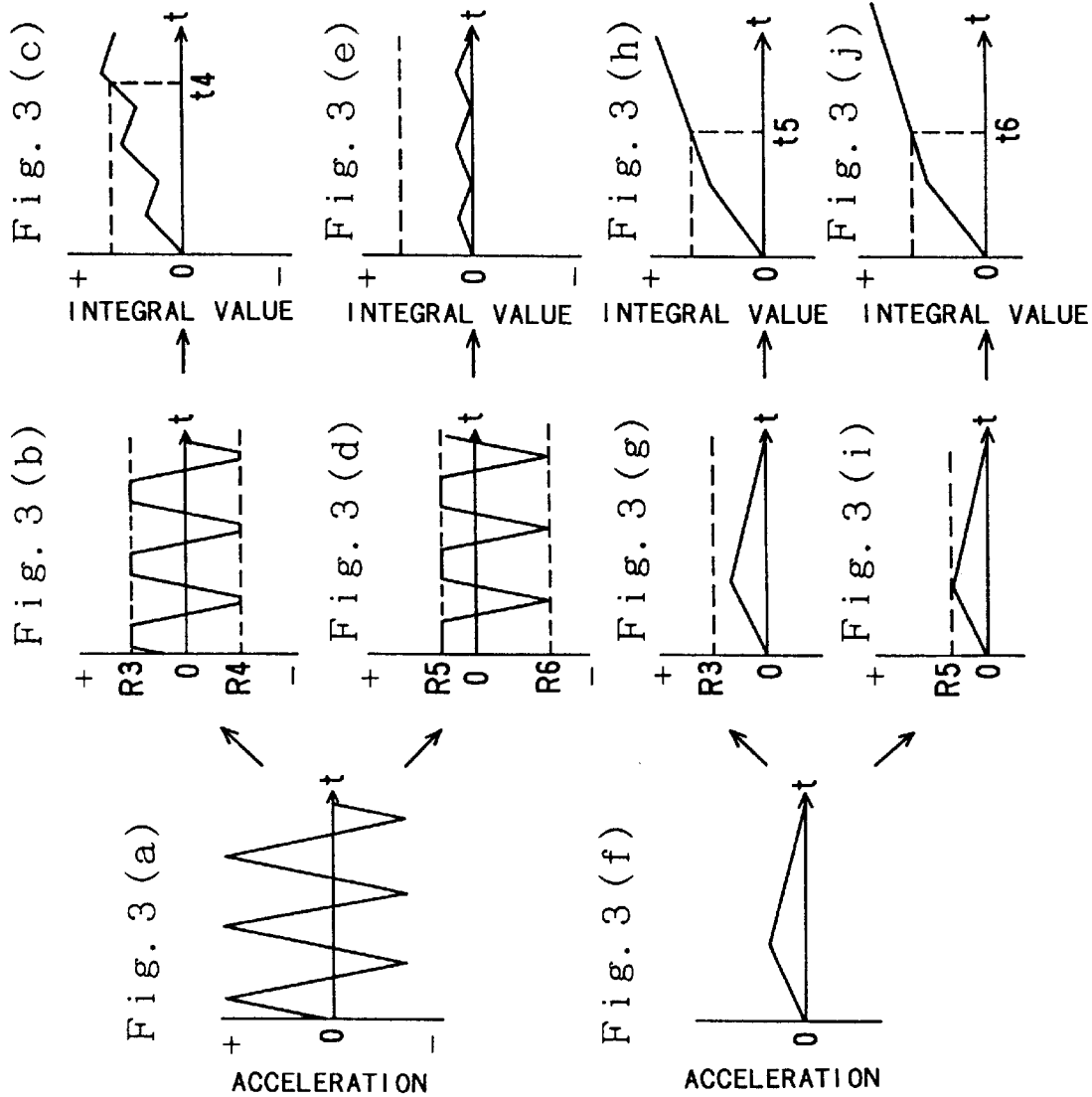
FIGS. 3(a) through 3(j) show the comparison in determination of activation or inactivation of passive restraints between the structure of a second embodiment and the conventional structure in case of an underside hit and in case of a collision of the vehicle.

The following describes the primary characteristics of this embodiment in case of an underside hit and in case of a collision of the vehicle. FIGS. 3(a) through 3(j) show the comparison in determination of activation or inactivation of passive restraints between the structure of the second embodiment and the conventional structure in case of an underside hit and in case of a collision of the vehicle. FIG. 3(a) shows the waveform of an acceleration signal detected in case of an underside hit; FIG. 3(b) the waveform of the acceleration signal immediately before integration in the conventional structure; and FIG. 3(c) the integral waveform of FIG. 3(b). FIG. 3(d) shows the waveform of the acceleration signal immediately before integration in the structure of this embodiment; and FIG. 3(e) the integral waveform of FIG. 3(d). FIG. 3(f) shows the waveform of an acceleration signal detected in case of a collision of the vehicle; FIG. 3(g) the waveform of the acceleration signal immediately before integration in the conventional structure; and FIG. 3(h) the integral waveform of FIG. 3(g). FIG. 3(i) shows the waveform of the acceleration signal immediately before integration in the structure of the embodiment; and FIG. 3(j) the integral waveform of FIG. 3(i). The definitions of the ordinate and abscissa in the graphs are identical with those of FIG. 2 and not specifically described here.

A typical procedure regulates the sensitivity of the observed acceleration signal to a predefined level with the amplifiers in the acceleration sensor. In order to regulate the sensitivity, the conventional structure sets identical level widths across the level '0' on the positive side and the negative side of the acceleration signal and extracts only the waveform segments included in the range of the preset level widths while cutting off the other waveform segments.

By way of example, levels R3 and R4 having identical absolute values (|R3|=|R4|) are set respectively as cut levels on the positive side and the negative side as shown in FIG. 3(b). The waveform segments of the acceleration signal higher than the level R3 and those lower than the level R4 are cut off, whereas the residual waveform segments between the levels R3 and R4 are extracted.

In case of an underside hit, the amplitude of the acceleration signal on the positive side is greater than the amplitude on the negative side as shown in FIG. 3(a). The waveform extraction in the identical level widths on the positive side and the negative side gives the acceleration signal as shown in FIG. 3(b).

Integration of the acceleration signal obtained as the result of such waveform extraction makes the absolute value of the integral on the positive side greater than that on the negative side. The overall integral value thus gradually increases and eventually exceeds the threshold value Th as shown in FIG. 3(c). This causes an inappropriate determination that the passive restraints are to be activated even in case of an underside hit.

In the structure of the second embodiment, on the other hand, the waveform extracting element 413 arranged, for example, in the A/D converter 412 sets a narrower level width on the positive side of the acceleration signal from the level '0' than a level width on the negative side and extracts only the waveform segments included in the range of the preset level widths.

By way of example, levels R5 and R6 are set respectively as cut levels, such that the level R5 on the positive side has a smaller absolute value than that of the level R6 on the negative side as shown in FIG. 3(d). The waveform segments of the acceleration signal higher than the level R5 and those lower than the level R6 are cut off, whereas the residual waveform segments between the levels R5 and R6 are extracted.

Such waveform extraction converts the acceleration signal observed in case of an underside hit as shown in FIG. 3(a) to the waveform-extracted acceleration signal as shown in FIG. 3(d). Namely the amplitude of the waveform-extracted acceleration signal on the positive side becomes smaller than the amplitude on the negative side.

The integration element 416 of the arithmetic operations unit 414 then integrates the waveform-extracted acceleration signal to make the absolute value of the integral on the positive side substantially identical with that on the negative side. This prevents the overall integral value from significantly increasing as shown in FIG. 3(e). Since the overall integral value does not exceed the threshold value Th, the decision unit 330 does not inappropriately determine that the passive restraints are to be activated in case of an underside hit.

In case of a collision of the vehicle, on the other hand, the waveform extraction process is not carried out unless the waveform of the acceleration signal on the positive side exceeds the level R5 as shown in FIG. 3(i). Subsequent integration of the resulting acceleration signal accordingly gives an integral value similar to that obtained in the conventional structure as shown in FIG. 3(j). This ensures an appropriate determination of activation or inactivation of passive restraints, in case of a collision of the vehicle.

In the second embodiment, as mentioned above, the waveform extracting element 413 that carries out the above waveform extraction process may be arranged inside the amplifier 250 or the amplifier 230, instead of in the A/D converter 412. The following describes concrete procedures of the waveform extraction process in the respective arrangements.

(1) When the Waveform Extraction Process is Carried Out in the A/D Converter 412

FIG. 4 shows possible output level widths of the primary circuits when the waveform extraction process is carried out in the A/D converter 412. In the drawing of FIG. 4, the horizontal solid a line represents the level '0' of the acceleration signal, and the four vertical solid lines respectively represent the possible output level widths of the transducer 210, the amplifier 230, the amplifier 250, and the A/D converter 412. The definitions of these solid lines are also adopted for the drawings of FIGS. 6 and 9 discussed later.

FIGS. 5(a) and 5(b) show the waveforms of the acceleration signals in the primary circuits when the waveform extraction process is carried out in the A/D converter 412. FIG. 5(a) shows the waveform of the acceleration signal output from the amplifier 250, and FIG. 5(b) shows the waveform of the acceleration signal output from the A/D converter 412.

Referring to FIG. 12, the acceleration signal output from the transducer 210 is input into the amplifier 250 via the filter 220, the amplifier 230, and the filter 240. Like the conventional structure, the amplifier 250 sets a possible output level width such that the positive side and the negative side have an identical level width as shown in FIG. 4 for the purpose of regulating the sensitivity, and allows passage of the waveform segments of the acceleration signal in the range of the preset possible output level width.

The acceleration signal output from the amplifier 250 is subsequently input into the A/D converter 412. The waveform extracting element 413 arranged in the A/D converter 412 sets a possible output level width such that the positive side has a narrower level width than that of the negative side as shown in FIG. 4, and extracts only the waveform segments in the range of the preset possible output level width while cutting off the other waveform segments. By way of example, in case that the acceleration signal as shown in FIG. 5(a) is output from the amplifier 250, the waveform segments on the positive side are cut off more significantly than those on the negative side as shown in FIG. 5(b). Namely the greater number of the waveform segments are extracted on the negative side than on the positive side.

The resulting acceleration signal having the greater number of the waveform segments extracted on the negative side than on the positive side is subsequently input into the integration element 416 of the arithmetic operations unit 414 and integrated with respect to time. This arrangement accordingly attains the effects discussed above.

(2) When the Waveform Extraction Process Is Carried Out in the Amplifier 250

FIG. 6 shows possible output level widths of the primary circuits when the waveform extraction process is carried out in the amplifier 250, and FIGS. 7(a) through 7(c) show the waveforms of the acceleration signals in the primary circuits when the waveform extraction process is carried out in the amplifier 250. FIG. 7(a) shows the waveform of the acceleration signal output from the filter 240, FIG. 7(b) the waveform of the acceleration signal output from the amplifier 250, and FIG. 7(c) the waveform of the acceleration signal output from the A/D converter 412.

Referring to FIG. 12, the acceleration signal output from the transducer 210 is input into the amplifier 250 via the filter 220, the amplifier 230, and the filter 240. The amplifier 250 regulates the sensitivity of the input acceleration signal. As shown in FIG. 7(b), the whole acceleration signal is shifted to the positive side with respect to the possible output level width of the amplifier 250, in order to implement the adjustment of the clamp level, in addition to the regulation of the sensitivity. The possible output level width of the amplifier 250 accordingly has a narrower level width on the positive side than that on the negative side as shown in FIG. 6. This enables the waveform segments of the acceleration signal on the positive side to be cut off more significantly than those on the negative side as shown in FIG. 7(b). Namely the greater number of the waveform segments are extracted on the negative side than on the positive side.

The acceleration signal output from the amplifier 250 is subsequently input into the A/D converter 412. The A/D converter 412 has a possible output level width set in the same manner as the conventional structure and allows passage of the waveform segments of the acceleration signal in the range of the preset possible output level width as shown in FIG. 6. The center level of the possible output level width is set to the level '0' of the acceleration signal output from the amplifier 250 as shown in FIG. 7(c).

The resulting acceleration signal having the greater number of the waveform segments extracted on the negative side than on the positive side is subsequently input into the integration element 416 of the arithmetic operations unit 414 and integrated with respect to time. This arrangement accordingly attains the effects discussed above.

Figure 8A:
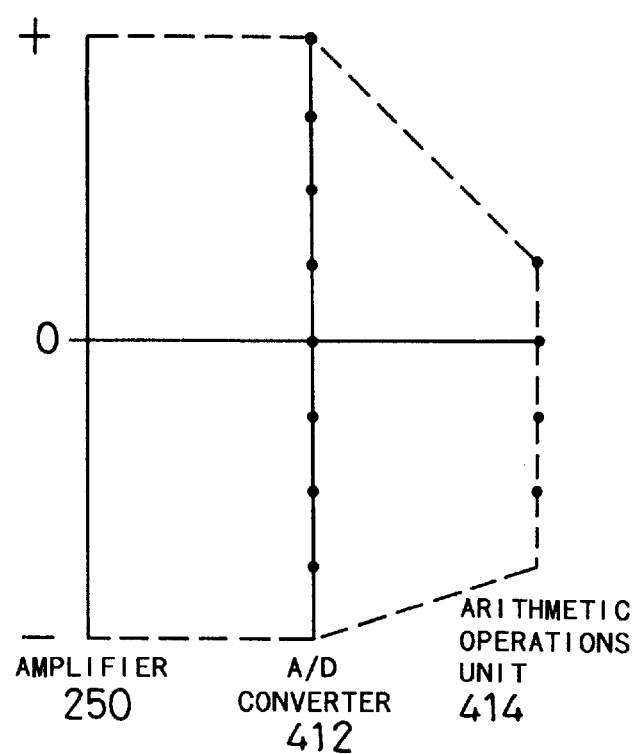
FIGS. 8(a) and 8(b) schematically show the levels of the acceleration signals that can be input into the amplifier 250, the A/D converter 412, and the arithmetic operations unit 414 shown in FIG. 12 in case of (1) and in case of (2), respectively.
Figure 8B:
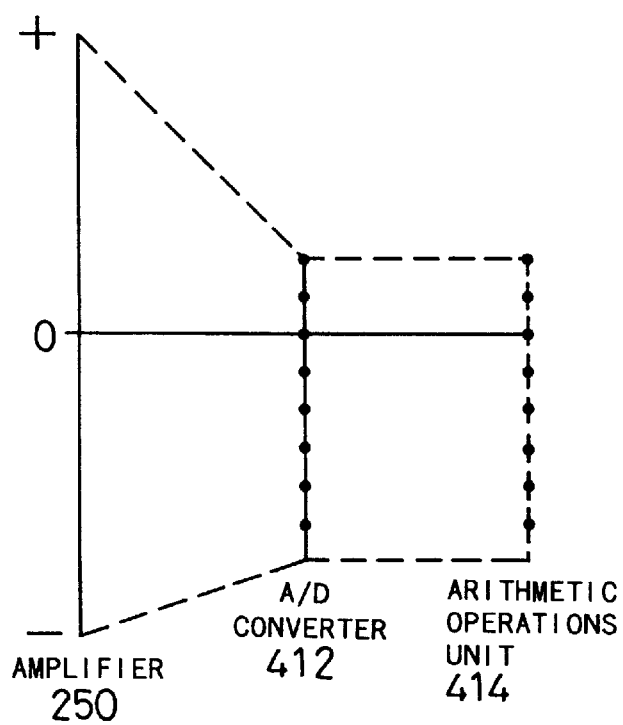

FIGS. 8(a) and 8(b) schematically show the levels of the acceleration signals that can be input into the amplifier 250, the A/D converter 412, and the arithmetic operations unit 414 shown in FIG. 12 in case of (1) and in case of (2), respectively. For the clarity of explanation, in the example of FIG. 8, the waveform extraction process is carried out between the input into the amplifier 250 and the input into the arithmetic operations unit 414, so as to reduce the amplitude of the acceleration signal to ½. It is assumed that the A/D converter 412 converts the input analog acceleration signal to a 3-bit digital acceleration signal (namely, quantizes the amplitude of the signal in eight level stages).

As discussed previously, in case of (1), the waveform extraction process is carried out in the A/D converter 412. In this arrangement, the A/D converter 412 quantizes the amplitude of the input acceleration signal in eight level stages and outputs only half the eight level stages, that is, only the four level stages while discarding the other four level stages as shown in FIG. 8(a). Only the inputs of four level stages are accordingly sent from the A/D converter 412 to the arithmetic operations unit 414, although the arithmetic operations unit 414 has the capacity of receiving the inputs of eight level stages.

In case of (2), the waveform extraction process is carried out in the amplifier 250, instead of the A/D converter 412. In this arrangement, the A/D converter 412 quantizes the amplitude of the input acceleration signal in eight level stages and outputs all the eight level stages as shown in FIG. 8(b). The arithmetic operations unit 414 accordingly receives the inputs of all the eight level stages.

Comparison between FIGS. 8(a) and 8(b) clearly shows that the amplitude of the acceleration signal input into the arithmetic operations unit 414 in case of (1) is identical with that in case of (2). The same amplitude of the signal is converted to four level stages and input into the arithmetic operations unit 414 in case of (1), while being converted to eight level stages in case of (2). The arrangement of the case (2) thus enables the arithmetic operations unit 414 to receive the signal having a less quantization error, compared with the arrangement of the case (1). (3) When the waveform extraction process is carried out in the amplifier 230.

Figure 9:
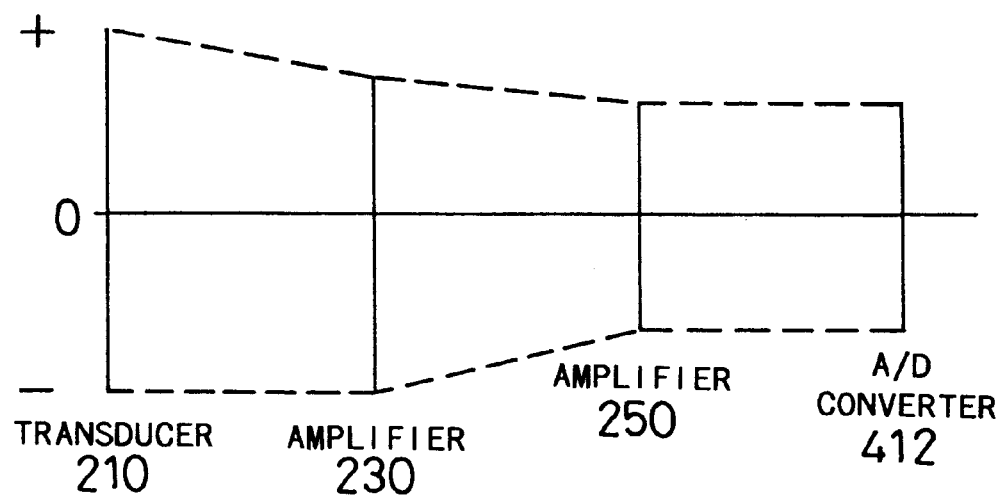
FIG. 9 shows possible output level widths of the primary circuits in case of (3) when the waveform extraction process is carried out in the amplifier 230 in the second embodiment.
Figure 10A:
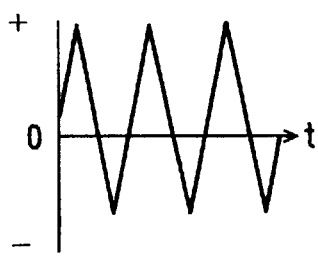
FIGS. 10(a) through 10(g) show the waveforms of the acceleration signals in the primary circuits when the waveform extraction process is carried out in the amplifier 230 in the second embodiment.

FIG. 9 shows possible output level widths of the primary circuits when the waveform extraction process is carried out in the amplifier 230, and FIGS. 10(a) through 10(g) show the waveforms of the acceleration signals in the primary circuits when the waveform extraction process is carried out in the amplifier 230. FIG. 10(a) shows the waveform of the acceleration signal output from the filter 220, FIG. 10(b) the waveform of the acceleration signal output from the amplifier 230, FIG. 10(c) the waveform of the acceleration signal output from the filter 240, FIG. 10(d) the AC component of the acceleration signal of FIG. 10(b), FIG. 10(e) the DC component of the acceleration signal of FIG. 10(b), FIG. 10(f) the AC component of the acceleration signal of FIG. 10(c), and FIG. 10(g) the DC component of the acceleration signal of FIG. 10(c).

Figure 10B:
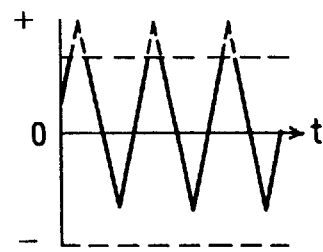

Referring to FIG. 12, the acceleration signal output from the transducer 210 is input into the amplifier 230 via the filter 220 and amplified in the amplifier 230 to a specific level that is substantially free from the noise effects. In order to implement the adjustment of the clamp level, the whole acceleration signal is shifted to the positive side, with respect to the possible output level width of the amplifier 230 as shown in FIG. 10(b). The possible output level width of the amplifier 230 accordingly has a narrower level width on the positive side than that on the negative side as shown in FIG. 9. This enables the waveform segments of the acceleration signal on the positive side to be cut off more significantly than those on the negative side as shown in FIG. 10(b). Namely the greater number of the waveform segments are extracted on the negative side than on the positive side. The possible output level width of the amplifier 230 is set to be wider than the possible output level width of the amplifier 250 as shown in FIG. 9.

Figure 10C:
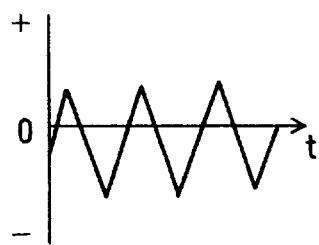
Figure 10D:
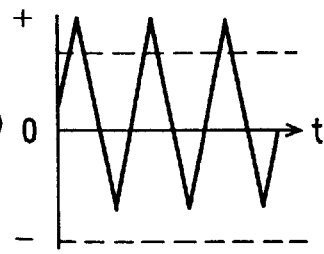
Figure 10E:
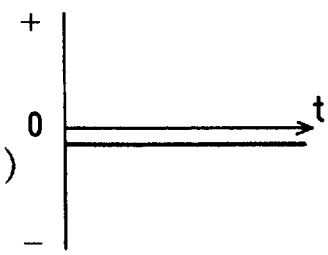

The acceleration signal of FIG. 10(b) thus obtained is decomposed into an AC component shown in FIG. 10(d) and a DC component shown in FIG. 10(e). The AC component shown in FIG. 10(d) is substantially identical with the acceleration signal of FIG. 10(a) before being input into the amplifier 230, whereas the significant cut-off process on the positive side gives a minus DC component as shown in FIG. 10(e).

Figure 10F:
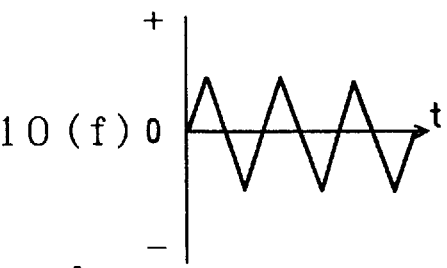
Figure 10G:
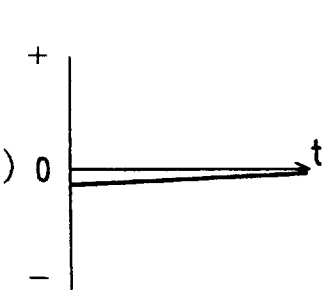
Figure 11:
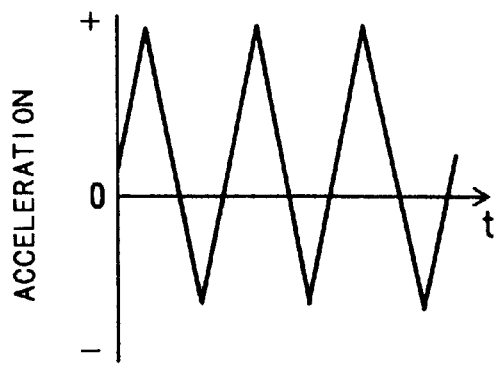
FIGS. 11(a) through 11(d) show the process of determining activation or inactivation of passive restraints by a conventional activation decision apparatus in case of an underside hit and in case of a collision of the vehicle.
Figure 11:
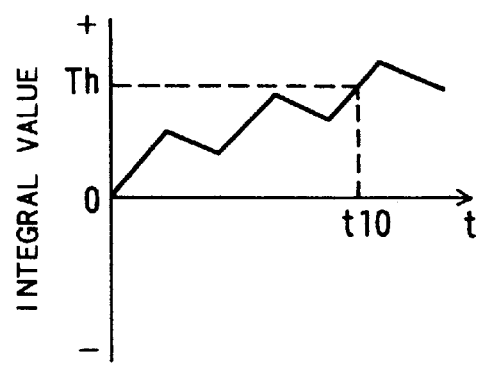
Figure 11:
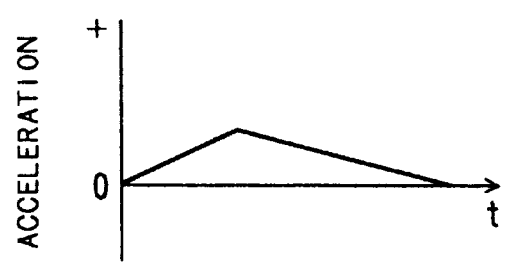
Figure 11:
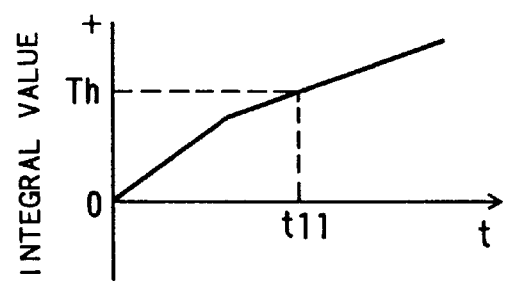

The filter 240 receives the acceleration signal output from the amplifier 230 and extracts only required signal components from the input acceleration signal while eliminating high-frequency components thereof. The filter 240 significantly eliminates the high-frequency components from the AC component shown in FIG. 10(d) and thereby reduces the amplitude as shown in FIG. 10(f). The filtering process, on the other hand, causes the DC component of FIG. 10(e) to vary slightly with a variation in time constant of the filter 240 as shown in FIG. 10(g). The resulting acceleration signal obtained by combining the AC component shown in FIG. 10(f) with the DC component shown in FIG. 10(g) and output from the filter 240 has the waveform as shown in FIG. 10(c). The filter 240 significantly damps the AC component of the acceleration signal (see FIG. 10(f)) but leaves the minus DC component (see FIG. 10(g)). The resulting acceleration signal output from the filter 240 accordingly has a tendency of having the larger amplitude on the negative side than that on the positive side as shown in FIG. 10(c).

The acceleration signal output from the filter 240 is then given to the amplifier 250. The amplifier 250 sets a possible output level width such that the positive side and the negative side have an identical level width as shown in FIG. 9, and allows passage of the waveform segments of the acceleration signal in the range of the preset possible output level width. The resulting acceleration signal output from the amplifier 250 accordingly has a tendency of having the larger waveform segment on the negative side than that on the positive side.

The acceleration signal output from the amplifier 250 is subsequently input into the A/D converter 412. The A/D converter 412 has a possible output level width set in the same manner as the conventional structure and allows passage of the waveform segments of the acceleration signal in the range of the preset possible output level width as shown in FIG. 9.

The resulting acceleration signal having the greater number of the waveform segments extracted on the negative side than on the positive side is subsequently input into the integration element 416 of the arithmetic operations unit 414 and integrated with respect to time. This arrangement accordingly attains the effects discussed above.

The present invention is not restricted to the above embodiments or applications, but there may be many modifications, changes, and alterations without departing from the scope or spirit of the main characteristics of the present invention.

Figure 13:
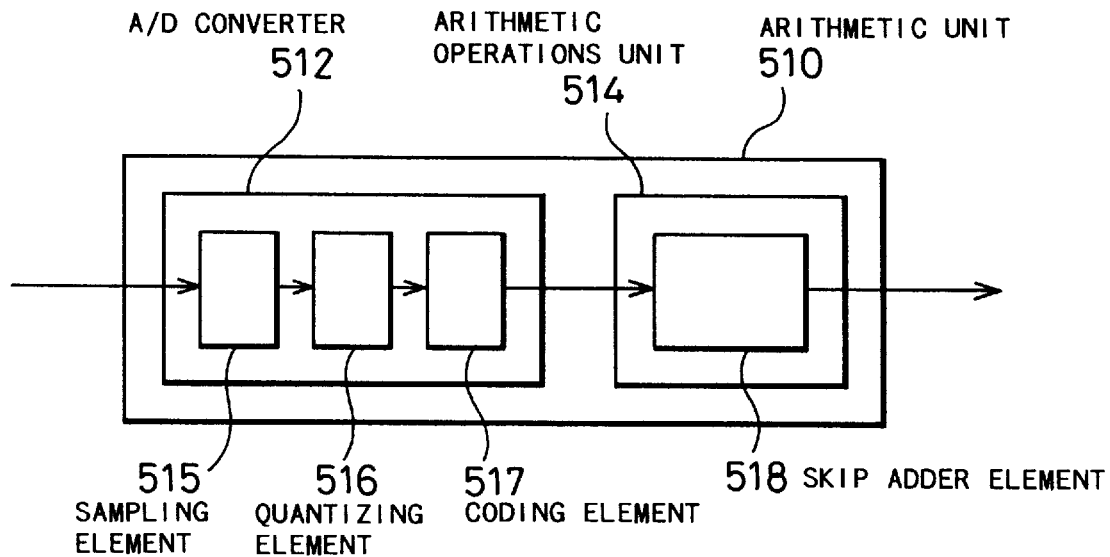
FIG. 13 is a block diagram illustrating structure of an arithmetic unit 510 used in an activation decision apparatus as a third embodiment according to the present invention.

FIG. 13 is a block diagram illustrating structure of an arithmetic unit 510 used in an activation decision apparatus as a third embodiment according to the present invention. The constituents of the activation decision apparatus of the third embodiment except the arithmetic unit 510 are identical with those of the first embodiment shown in FIG. 1.

In the structure of the first embodiment, after the A/D converter 312 of the arithmetic unit 310 converts the analog acceleration signal to a digital signal, the integration element 318 of the arithmetic operations unit 314 accumulates the digital signal for integration.

In the structure of the third embodiment, on the other hand, an arithmetic operations unit 514 includes a skip adder element 518. The skip adder element 518 adds the alternate data for waveform segments of not lower than the first level R1 (see FIG. 2(d)) out of a digital acceleration signal output from an A/D converter 512, and adds all the data for waveform segments of lower than the first level R1. In the former case, for example, only 50 data out of 100 original data are added. The procedure of skipping the alternate data in the process of adding the waveform segments of the digital acceleration signal that are not lower than the first level R1 decreases the absolute value of the integral that is not lower than a reference level (level '0'), while keeping the absolute value of the integral that is not higher than the reference level unchanged. The resulting integral value obtained as the sum is accordingly lessened. This procedure effectively prevents the overall integral value from exceeding a predefined threshold value.

Referring to FIG. 13, the A/D converter 512 has a known structure and includes a sampling element 515 for sampling the analog acceleration signal, a quantizing element 516 for quantizing the sampled acceleration signal, and a coding element 517 for coding the quantized acceleration signal and generating a digital signal.

Figure 14:
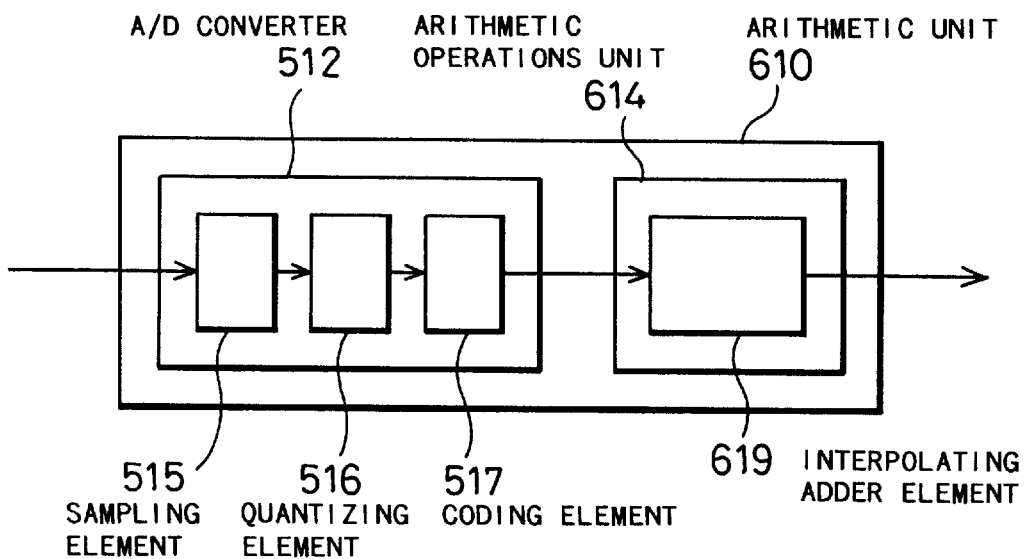
FIG. 14 is a block diagram illustrating structure of an arithmetic unit 610 used in an activation decision apparatus as a fourth embodiment according to the present invention.

FIG. 14 is a block diagram illustrating structure of an arithmetic unit 610 used in an activation decision apparatus as a fourth embodiment according to the present invention. The constituents of the activation decision apparatus of the fourth embodiment except the arithmetic unit 610 are identical with those of the first embodiment shown in FIG. 1.

As discussed above, in the structure of the third embodiment, the skip adder element 518 in the arithmetic operations unit 514 skips the alternate data in the process of adding the waveform segments of the digital acceleration signal that are not lower than the first level R1.

In the structure of the fourth embodiment, on the other hand, an arithmetic operations unit 614 has an interpolating adder element 619. The interpolating adder element 619 adds all the data for waveform segments of higher than the second level R2 (see FIG. 2(d)) out of a digital acceleration signal output from an A/D converter 512, and inserts additional data of a predetermined value that is lower than the reference level between the original data in the process of addition for waveform segments of not higher than the second level R2. In the latter case, for example, 50 data are newly inserted into 100 original data, and the total of 150 data are added. The procedure of interpolating additional data in the process of adding the waveform segments of the digital acceleration signal that are not higher than the second level R2 keeps the absolute value of the integral that is not lower than the reference level unchanged, while increasing the absolute value of the integral that is not higher than the reference level. The resulting integral value obtained as the sum is accordingly lessened. This procedure effectively prevents the overall integral value from exceeding a predefined threshold value.

The procedures of separately adding the waveform segments on different levels are applicable to the analog signal, as well as the digital signal discussed above.

Figure 15A:
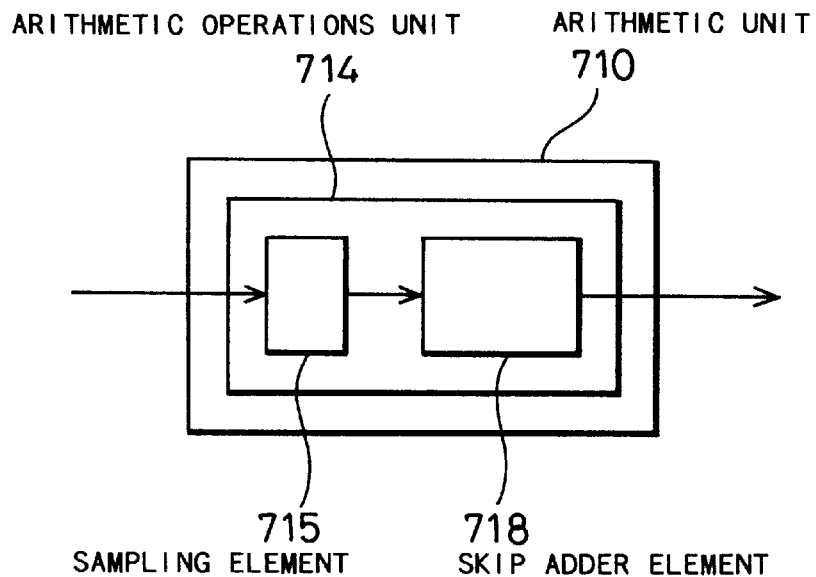
FIGS. 15(a) and 15(b) are block diagrams respectively illustrating structures of arithmetic units 710 and 810 used in an activation decision apparatus as a fifth embodiment according to the present invention.
Figure 15B:
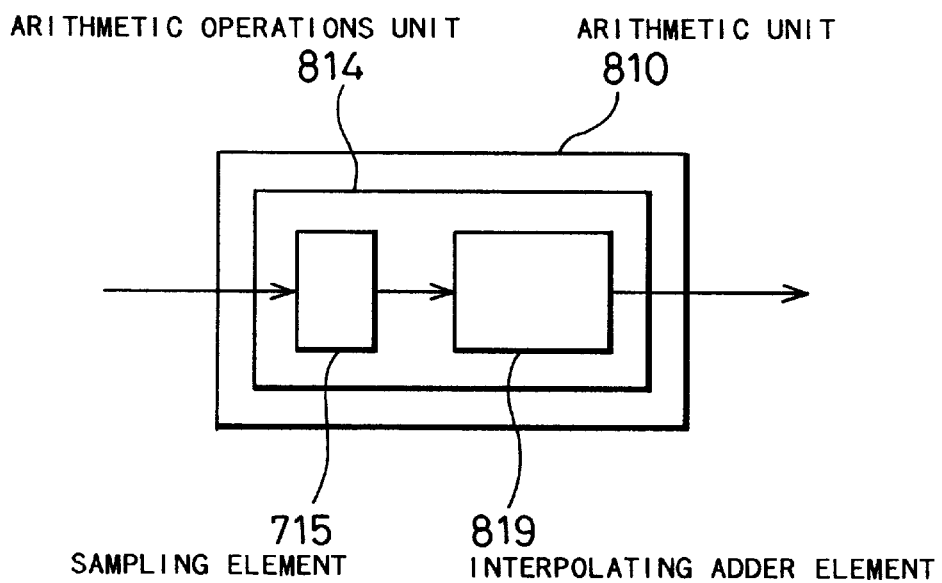

FIGS. 15(a) and 15(b) are block diagrams respectively illustrating structures of arithmetic units 710 and 810 used in an activation decision apparatus as a fifth embodiment according to the present invention. The constituents of the activation decision apparatus of the fifth embodiment except the arithmetic unit 710 or 810 are identical with those of the first embodiment shown in FIG. 1.

As discussed previously, in the structures of the third and the fourth embodiments having the A/D converter 512 for converting the analog acceleration signal to a digital signal, the sampling element 515 samples the analog signal, the quantizing element 516 quantizes the sampled signal, and the coding element 517 codes the quantized signal to generate a digital signal.

In the structure of the fifth embodiment, on the other hand, arithmetic operations units 714 and 814 in the arithmetic units 710 and 810 respectively have a sampling element 715 as shown in FIGS. 15(a) and 15(b). A skip adder element 718 or an interpolating adder element 819 then carries out the addition as discussed above for the sampled discrete analog signal (that is, analog values). This structure exerts the same effects as those of the third and the fourth embodiments discussed above.

Although the above embodiments are related to the structure of determining activation or inactivation of passive restraints for frontal crash, the principle of the present invention is also applicable to the structure of determining activation or inactivation of passive restraints for side collision. Like a frontal crash, a side collision is a non-elastic collision that accompanies deformation of the body. It is assumed that the direction of collision is defined as the positive side. For example, when the impact is applied rightward with respect to the vehicle, that is, when a car rams into the left side of the vehicle, the rightward direction is on the positive side. In this case, the accelerations applied to the vehicle occur more significantly on the positive side than on the negative side. Like the underside hit discussed above, when a door of the vehicle is slammed shut, the accelerations applied to the vehicle remarkably fluctuate on both the positive side and the negative side. The structure of the present invention determines that the passive restraints for side collision are to be activated when the vehicle crashes in a side collision, but determines that the passive restraints are not to be activated when the door is slammed shut. This ensures an appropriate determination of activation or inactivation of the passive restraints for side collision.

Although the impact applied to the vehicle is detected as the acceleration in the above embodiments, the impact force itself may be detected instead.

Figure 16:
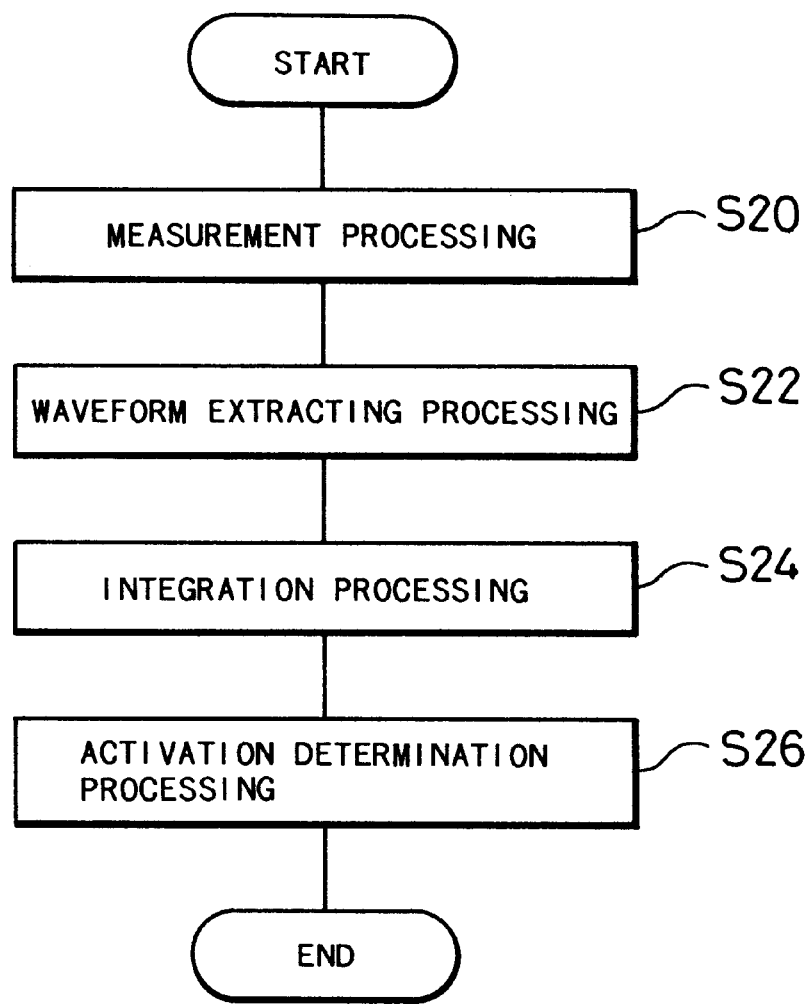
FIG. 16 is a flow chart illustrating the processing routine of an activation decision method as a fifth embodiment according to the present invention.

FIG. 16 is a flow chart illustrating the processing routine of an activation decision method as a fifth embodiment according to the present invention. The activation decision method illustrated in FIG. 16 is executed by, for example, an acceleration sensor and an arithmetic processing circuit. In this embodiment, the acceleration sensor 200 as shown in FIG. 12 is used as an acceleration sensor. The arithmetic processing circuit may be composed of, for example, a CPU, a ROM, a RAM, an I/O circuit, and so on. When the CPU executes a program stored in the ROM or RAM, the arithmetic processing circuit performs each of the processings described later.

In this embodiment, first, the acceleration sensor measures an impact applied in a specified direction of a vehicle, as the measurement processing of step S20 and obtains a detection signal, which has a reference level set at an observed level when no impact is applied to the vehicle. Next, the CPU of the arithmetic processing circuit, as the waveform extracting processing of step S22, sets a first level that is higher than the reference level of the detection signal but lower than a maximum level of the detection signal and a second level that is lower than the reference level of the detection signal but higher than a minimum level of the detection signal, and extracts waveform segments of the detection signal between the first level and the second level. The CPU, however, sets a level width between the reference level and the first level to be narrower than a level width between the reference level and the second level.

The CPU then integrates the waveform-extracted signals as the integration processing of step S24. Further, the CPU, as the activation determination processing of step S26, compares the integral value obtained by the integration processing with a preset threshold value and determines whether the passive restraints are to be activated, based on a result of the comparison The activation determination executed according to this embodiment exerts the same effects as the second embodiment.

Figure 17:
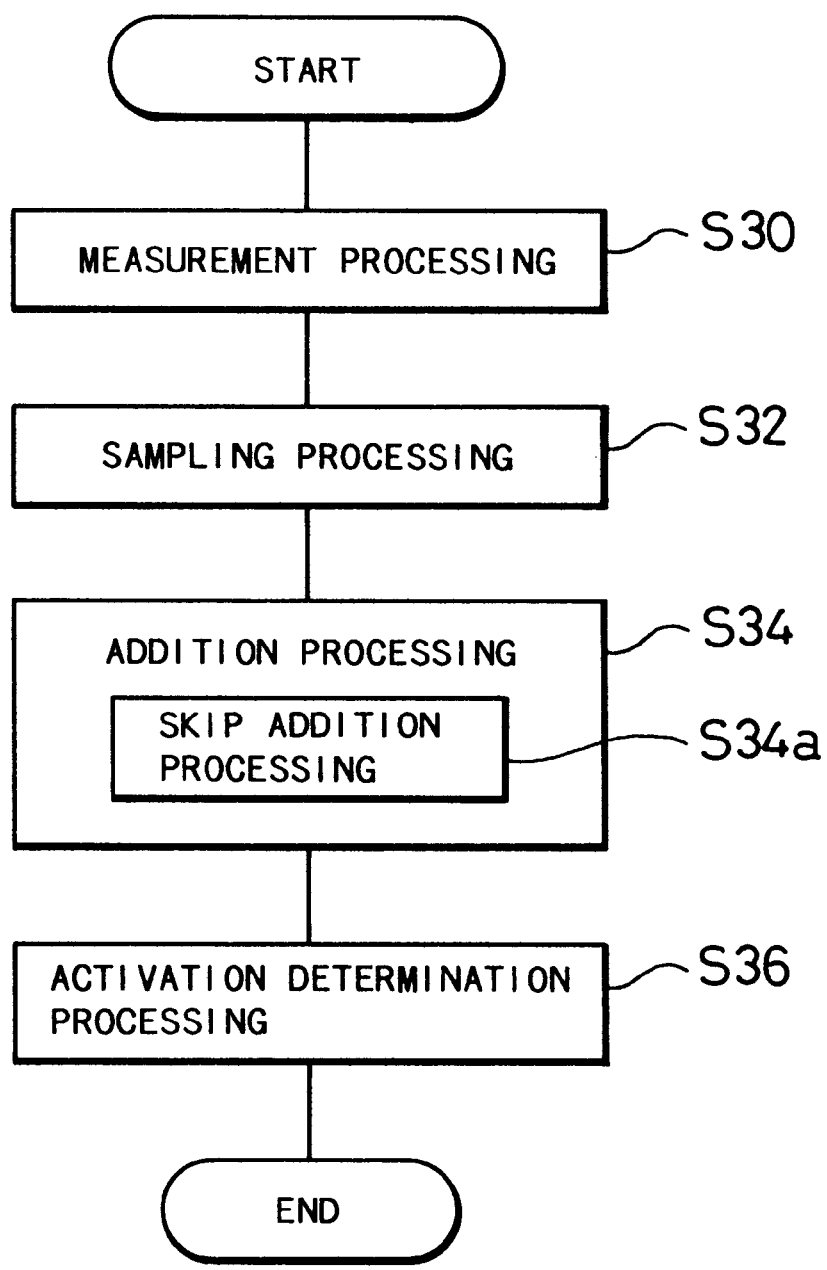
FIG. 17 is a flow chart illustrating the processing routine of an activation decision method as a sixth embodiment according to the present invention.

FIG. 17 is a flow chart illustrating the processing routine of an activation decision method as a sixth embodiment according to the present invention. The activation decision method illustrated in FIG. 17 is executed by, for example, an acceleration sensor and an arithmetic processing circuit like the activation decision method shown in FIG. 16. In this embodiment also, the acceleration sensor 200 as shown in FIG. 12 is used as an acceleration sensor. The arithmetic processing circuit may also be composed of, for example, a CPU, a ROM, a RAM, an I/O circuit, and so on. When the CPU executes a program stored in the ROM or RAM, the arithmetic processing circuit performs each of the processings described later.

In this embodiment, first, the acceleration sensor measures an impact applied in a specified direction of a vehicle, as the measurement processing of step S30 and obtains a detection signal, which has a reference level set at an observed level when no impact is applied to the vehicle. Next, the CPU of the arithmetic processing circuit samples the detection signal in time series as the sampling processing of step S32 and adds levels of the sampled detection signal to make a total as the addition processing of step S34. In the addition processing, the CPU sets a specific level that is higher than the above-mentioned reference level of the detection signal but lower than a maximum level of the detection signal, and skips some data of the sampled detection signal in the process of adding the levels of the sampled detection signal that are not lower than the specific level (step S34a).

Further, the CPU, as the activation determination processing of step S36, compares the total obtained by the addition with a preset threshold value and determines whether the passive restraints are to be activated, based on a result of the comparison The activation determination executed according to this embodiment exerts the same effects as the third embodiment.

Figure 18:
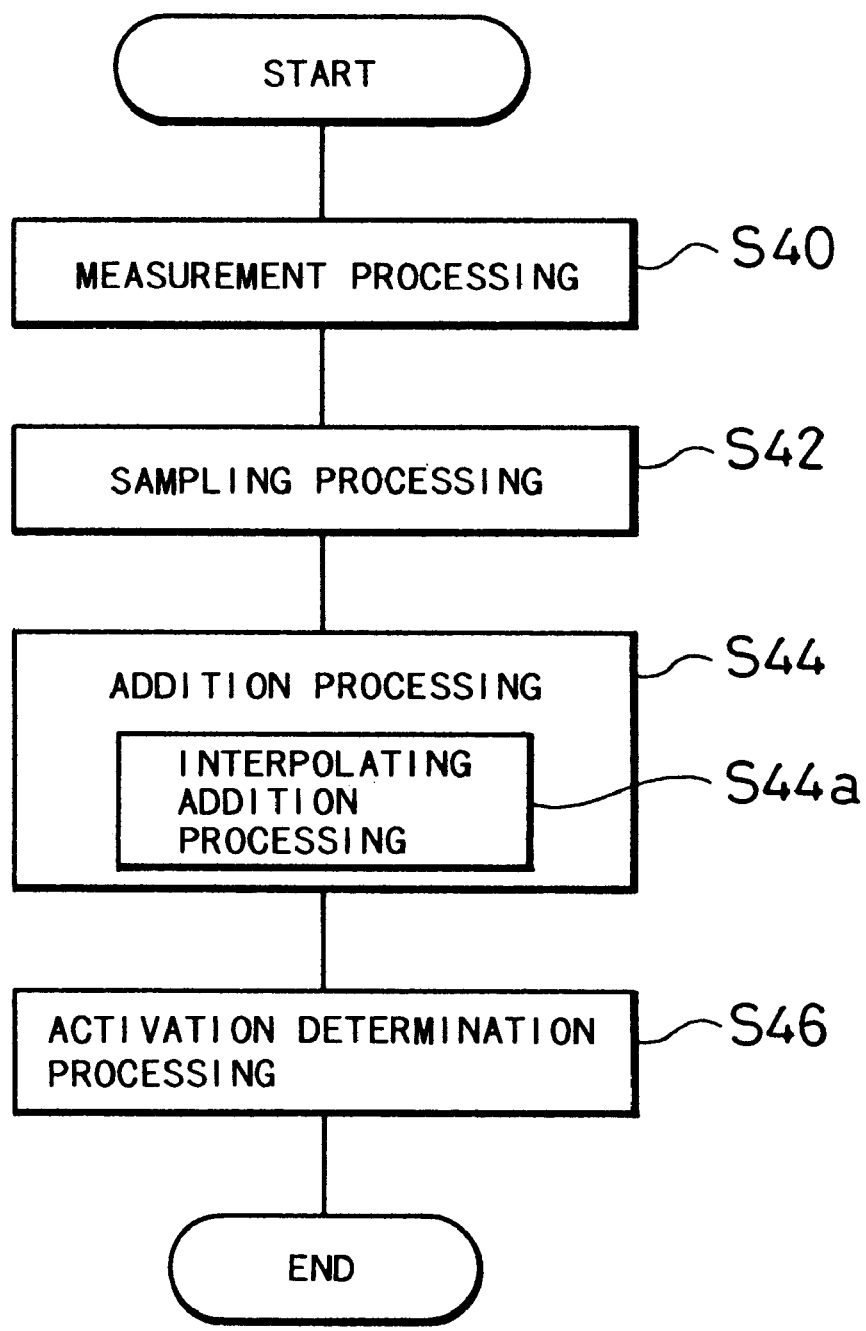
FIG. 18 is a flow chart illustrating the processing routine of an activation decision method as a seventh embodiment according to the present invention.

FIG. 18 is a flow chart illustrating the processing routine of an activation decision method as a seventh embodiment according to the present invention. The activation decision method illustrated in FIG. 18 is executed by, for example, an acceleration sensor and an arithmetic processing circuit like the activation decision method shown in FIGS. 16 and 17. In this embodiment also, the acceleration sensor 200 as shown in FIG. 12 is used. The arithmetic processing circuit may also be composed of, for example, a CPU, a ROM, a RAM, an I/O circuit, and so on. When the CPU executes a program stored in the ROM or RAM, the arithmetic processing circuit performs each of the processings described later.

In this embodiment, first, the acceleration sensor measures an impact applied in a specified direction of a vehicle, as the measurement processing of step S40 and obtains a detection signal, which has a reference level set at an observed level when no impact is applied to the vehicle. Next, the CPU of the arithmetic processing circuit samples the detection signal in time series as the sampling processing of step S42 and adds levels of the sampled detection signal to make a total as the addition processing of step S44. In the addition processing, the CPU sets a specific level that is lower than the above-mentioned reference level of the detection signal but higher than a minimum level of the detection signal, and interpolates signal levels lower than the reference level into the sampled detection signal in the process of adding the levels of the sampled detection signal that are not higher than the specific level (step S44a).

Further, the CPU, as the activation determination processing of step S46, compares the total obtained by the addition with a preset threshold value and determines whether the passive restraints are to be activated, based on a result of the comparison The activation determination executed according to this embodiment exerts the same effects as the fourth embodiment.

It should be clearly understood that the embodiments discussed above are only illustrative and not restrictive in any sense. The scope and spirit of the present invention are limited only by the terms of the appended claims.

What is claimed is:

1. An activation decision apparatus for determining whether passive restraints mounted on a vehicle are to be activated, said activation decision apparatus comprising:

measurement means for measuring an impact applied in a specified direction of said vehicle and outputting a detection signal, which has a reference level set at an observed level when no impact is applied to said vehicle;

waveform deforming means for deforming a waveform of the detection signal and generating waveform-deformed signals, wherein said waveform deforming means comprises:

means for setting a specific level that is higher than the reference level of the detection signal but lower than a maximum level of the detection signal and multiplying waveform segments of the detection signal that are not lower than the specific level by a coefficient 'm', where 0<m<1, thereby deforming the waveform of the detection signal;

integration means for integrating the waveform-deformed signals to obtain an integral value; and activation determination means for comparing the integral value obtained by said integration means with a preset threshold value and determining whether said passive restraints are to be activated, based on a result of the comparison, wherein said waveform deforming means deforms the waveform of the detection signal, at least such that an absolute value of an integral obtained by integrating waveform segments of the waveform-deformed signal that are not lower than the reference level becomes smaller than an absolute value of an integral obtained by integrating waveform segments of the detection signal that are not lower than the reference level.

2. An activation decision apparatus for determining whether passive restraints mounted on a vehicle are to be activated, said activation decision apparatus comprising:

measurement means for measuring an impact applied in a specified direction of said vehicle and outputting a detection signal, which has a reference level set at an observed level when no impact is applied to said vehicle, wherein said measurement means measures an impact applied in a longitudinal direction of said vehicle and outputs the detection signal by setting a magnitude of the impact applied backward as a positive level and a magnitude of the impact applied forward as a negative level;

waveform deforming means for deforming a waveform of the detection signal and generating waveform-deformed signals;

integration means for integrating the waveform-deformed signals to obtain an integral value; and activation determination means for comparing the integral value obtained by said integration means with a preset threshold value and determining whether said passive restraints are to be activated, based on a result of the comparison, wherein said waveform deforming means deforms the waveform of the detection signal, at least such that an absolute value of an integral obtained by integrating waveform segments of the waveform-deformed signal that are not lower than the reference level becomes smaller than an absolute value of an integral obtained by integrating waveform segments of the detection signal that are not lower than the reference level.

3. An activation decision method comprising the steps of:

(a) measuring an impact applied in a specified direction of said vehicle and obtaining a detection signal, which has a reference level set at an observed level when no impact is applied to said vehicle;

(b) sampling the detection signal in time series;

(c) adding levels of the sampled detection signal to make a total; and (d) comparing the total obtained by said step (c) with a preset threshold value and determining whether said passive restraints are to be activated, based on a result of the comparison, wherein said step (c) comprises at least the step of:

(e) setting a specific level that is higher than the reference level of the detection signal but lower than a maximum level of the detection signal, and skipping some data of the sampled detection signal in the process of adding the levels of the sampled detection signal that are not lower than the specific level.

4. An activation decision method comprising the steps of:
(a) measuring an impact applied in a specified direction of said vehicle and obtaining a detection signal, which has a reference level set at an observed level when no impact is applied to said vehicle;
(b) sampling the detection signal in time series;
(c) adding levels of the sampled detection signal to make a total; and
(d) comparing the total obtained by said step (c) with a preset threshold value and determining whether said passive restraints are to be activated, based on a result of the comparison,
wherein said step (c) comprises at least the step of:
(e) setting a specific level that is lower than the reference level of the detection signal but higher than a minimum level of the detection signal, and interpolating signal levels lower than the reference level into the sampled detection signal in the process of adding the levels of the sampled detection signal that are not higher than the specific level.

5. An activation decision method comprising the steps of:
(a) measuring an impact applied in a specified direction of said vehicle and obtaining a detection signal, which has a reference level set at an observed level when no impact is applied to said vehicle;
(b) setting a first level that is higher than the reference level of the detection signal but lower than a maximum level of the detection signal and a second level that is lower than the reference level of the detection signal but higher than a minimum level of the detection signal and extracting waveform segments of the detection signal between said first level and said second level, thereby generating waveform-extracted signals;
(c) integrating the waveform-extracted signals to obtain an integral value; and
(d) comparing the integral value obtained by said step (c) with a preset threshold value and determining whether said passive restraints are to be activated, based on a result of the comparison,
wherein a level width between the reference level and the first level is narrower than a level width between the reference level and the second level.

6. An activation decision apparatus for determining whether passive restraints mounted on a vehicle are to be activated, said activation decision apparatus comprising:
measurement means for measuring an impact applied in a specified direction of said vehicle and outputting a detection signal, which has a reference level set at an observed level when no impact is applied to said vehicle;
waveform deforming means for deforming a waveform of the detection signal and generating waveform-deformed signals;
integration means for integrating the waveform-deformed signals to obtain an integral value; and
activation determination means for comparing the integral value obtained by said integration means with a preset threshold value and determining whether said passive restraints are to be activated, based on a result of the comparison,
wherein said waveform deforming means deforms the waveform of the detection signal, at least such that an absolute value of an integral obtained by integrating waveform segments of the waveform-deformed signal that are not higher than the reference level becomes larger than an absolute value of an integral obtained by integrating waveform segments of the detection signal that are not higher than the reference level.

7. The activation decision apparatus in accordance with claim 6, wherein said waveform deforming means comprises:
means for setting a specific level that is lower than the reference level of the detection signal but higher than a minimum level of the detection signal and multiplying waveform segments of the detection signal that are not higher than the specific level by a coefficient 'n', where 1<n, thereby deforming the waveform of the detection signal.

8. The activation decision apparatus in accordance with claim 6, wherein said measurement means measures an impact applied in a longitudinal direction of said vehicle and outputs the detection signal by setting a magnitude of the impact applied backward as a positive level and a magnitude of the impact applied forward as a negative level.

9. An activation decision apparatus for determining whether passive restraints mounted on a vehicle are to be activated, said activation decision apparatus comprising:
measurement means for measuring an impact applied in a specified direction of said vehicle and outputting a detection signal, which has a reference level set at an observed level when no impact is applied to said vehicle;
waveform extracting means for setting a first level that is higher than the reference level of the detection signal but lower than a maximum level of the detection signal and a second level that is lower than the reference level of the detection signal but higher than a minimum level of the detection signal and extracting waveform segments of the detection signal between said first level and said second level, thereby generating waveform-extracted signals;
integration means for integrating the waveform-extracted signals to obtain an integral value; and
activation determination means for comparing the integral value obtained by said integration means with a preset threshold value and determining whether said passive restraints are to be activated, based on a result of the comparison,
wherein a level width between the reference level and the first level is narrower than a level width between the reference level and the second level.

10. The activation decision apparatus in accordance with claim 9, wherein said measurement means measures an impact applied in a longitudinal direction of said vehicle and outputs the detection signal by setting a magnitude of the impact applied backward as a positive level and a magnitude of the impact applied forward as a negative level.

11. An activation decision apparatus for determining whether passive restraints mounted on a vehicle are to be activated, said activation decision apparatus comprising:
measurement means for measuring an impact applied in a specified direction of said vehicle and outputting a detection signal, which has a reference level set at an observed level when no impact is applied to said vehicle;
sampling means for sampling the detection signal in time series;
addition means for adding levels of the sampled detection signal to make a total; and activation determination means for comparing the total obtained by said addition means with a preset threshold value and determining whether said passive restraints are to be activated, based on a result of the comparison, wherein said addition means comprises at least:

means for setting a specific level that is higher than the reference level of the detection signal but lower than a maximum level of the detection signal, and skipping some data of the sampled detection signal in the process of adding the levels of the sampled detection signal that are not lower than the specific level.

12. The activation decision apparatus in accordance with claim 11, said activation decision apparatus further comprising:

conversion means for converting the detection signal in an analog form to a digital signal, wherein said sampling means is included in said conversion means.

13. The activation decision apparatus in accordance with claim 11, wherein said measurement means measures an impact applied in a longitudinal direction of said vehicle and outputs the detection signal by setting a magnitude of the impact applied backward as a positive level and a magnitude of the impact applied forward as a negative level.

14. An activation decision apparatus for determining whether passive restraints mounted on a vehicle are to be activated, said activation decision apparatus comprising:

measurement means for measuring an impact applied in a specified direction of said vehicle and outputting a detection signal, which has a reference level set at an observed level when no impact is applied to said vehicle;

sampling means for sampling the detection signal in time series;

addition means for adding levels of the sampled detection signal to make a total; and activation determination means for comparing the total obtained by said addition means with a preset threshold value and determining whether said passive restraints are to be activated, based on a result of the comparison, wherein said addition means comprises at least:

means for setting a specific level that is lower than the reference level of the detection signal but higher than a minimum level of the detection signal, and interpolating signal levels lower than the reference level into the sampled detection signal in the process of adding the levels of the sampled detection signal that are not higher than the specific level.

15. The activation decision apparatus in accordance with claim 14, said activation decision apparatus further comprising:

conversion means for converting the detection signal in an analog form to a digital signal, wherein said sampling means is included in said conversion means.

16. The activation decision apparatus in accordance with claim 14, wherein said measurement means measures an impact applied in a longitudinal direction of said vehicle and outputs the detection signal by setting a magnitude of the impact applied backward as a positive level and a magnitude of the impact applied forward as a negative level.

* * * * *